US008103577B2

(12) United States Patent
Sakaue et al.

(10) Patent No.: US 8,103,577 B2
(45) Date of Patent: Jan. 24, 2012

(54) AUCTION SYSTEM AND SYSTEM OF FORMING INVESTMENT TRUST AND FINANCIAL PRODUCTS AND FUNDS INCLUDING VIATICAL AND LIFE SETTLEMENT

(75) Inventors: Kenji Sakaue, Yokohama (JP); Reiko Sakaue, Yokohama (JP)

(73) Assignee: Research Center for the Prevention of Diabetes, Kanagawa (JP)

( * ) Notice: Subject to any disclaimer, the term of this patent is extended or adjusted under 35 U.S.C. 154(b) by 292 days.

(21) Appl. No.: 12/318,652

(22) Filed: Jan. 5, 2009

(65) Prior Publication Data
US 2009/0119134 A1 May 7, 2009

Related U.S. Application Data

(62) Division of application No. 11/077,038, filed on Mar. 11, 2005, now abandoned.

(51) Int. Cl.
G06Q 40/00 (2006.01)
(52) U.S. Cl. ............................................. 705/37; 705/4
(58) Field of Classification Search .................... 705/38, 705/36 R, 36 T, 4, 3, 35, 7, 37
See application file for complete search history.

(56) References Cited

U.S. PATENT DOCUMENTS

| 5,845,265 | A | * | 12/1998 | Woolston | 705/37 |
| 6,393,405 | B1 | * | 5/2002 | Vicente | 705/4 |
| 2002/0013757 | A1 | | 1/2002 | Bykowsky et al. | |
| 2003/0195835 | A1 | | 10/2003 | Sandholm et al. | |
| 2004/0267647 | A1 | * | 12/2004 | Brisbois | 705/35 |
| 2005/0192849 | A1 | * | 9/2005 | Spalding | 705/4 |
| 2005/0216316 | A1 | * | 9/2005 | Brisbois et al. | 705/4 |
| 2006/0031151 | A1 | * | 2/2006 | Dorr | 705/37 |
| 2006/0143055 | A1 | * | 6/2006 | Loy et al. | 705/4 |
| 2006/0178979 | A1 | * | 8/2006 | Levine et al. | 705/37 |

FOREIGN PATENT DOCUMENTS

| JP | 2002-074071 A | 3/2002 |
| JP | 2002-183506 A | 6/2002 |
| JP | 2002-352118 A | 12/2002 |
| JP | 2003-516591 A | 5/2003 |

(Continued)

OTHER PUBLICATIONS

Sutherland et al. "Viatical settlements: Life insurance as a liquid asset for the seriously ill" May 1999 Journal of Financial Planning v12n5 pp. 74-78.*

(Continued)

Primary Examiner — Kelly Campen
(74) Attorney, Agent, or Firm — Jacobson Holman PLLC

(57) ABSTRACT

A computer-implemented system for trading a viatical and life settlement insurance policy receives a seller's selling price for the policy; divides the policy into a plurality of units; determines a price of one unit based on the number of units; receives a purchase price of the policy from at least one potential purchaser; makes an initial determination of the number of units bought by the potential purchaser in order to be allocated depending on the purchase price; compares the total number of units allocated to the potential purchaser with the total number of units into which the policy was divided; adjusts the price of one unit based on this comparison; and redetermines the number of units allocated to the potential purchaser, depending on the adjusted purchase price. The system repeats making the comparison, the price adjustment, and the redetermination for a given amount of time.

10 Claims, 18 Drawing Sheets

FOREIGN PATENT DOCUMENTS

| | | |
|---|---|---|
| JP | 2004-005570 A | 1/2004 |
| JP | 2004-080663 A | 3/2004 |
| JP | 2004-310469 A | 11/2004 |
| JP | 2004-362063 A | 12/2004 |

OTHER PUBLICATIONS

Frommer, Tom "Viaticals—let justice prevail!" Nov./Dec. 1999 Financial Services Advisor v142n6 pp. 48-50.*

Hersch, Warren "Life Settlements More Popular With Agents and Insureds" Feb. 7, 2005 National Underwriter. Life & Health v109n5 pp. 12-13.*

"Buying out of a life insurance of death. The first venture company in Japan. Transfer an ownership (of a life policy). Life Insurance Company refused. Patient's side. Lawsuits in near the future," Tokyo News Paper, Feb. 7, 2005. Morning version. p. 1.

* cited by examiner

FIG.11

PURCHASER ID  ABK  12345   XYZ PENSION FUND

SET EXPIRATION DATE (6) YEARS  DESIRED MINIMUM DIVIDEND NOT LESS THAN [5] %  STABLE TYPE
INVESTMENT AMOUNT  200 MILLION YEN   TODAY'S EXCHANGE RATE OF 1 DOLLAR
SET DISTRIBUTION TO AND RATIOS OF CALCULATED EXPECTED LIVES OF VIATICAL
AND LIFE SETTLEMENT POLICIES.

| ESTIMATED REMAINING LIFE | DISTRIBUTION | RATIO |
|---|---|---|
| 1-YEAR COURSE | | |
| 2-YEAR COURSE | ○ | 20% |
| 3-YEAR COURSE | ○ | 40% |
| 4-YEAR COURSE | ○ | 30% |
| 5-YEAR COURSE | ○ | 10% |
| 6-YEAR COURSE | | |

DO YOU SELECT AND DISTRIBUTE A TYPE OF DECEASE?  YES  NO
DO YOU SELECT A RANK OF AN INSURANCE COMPANY?  YES  NO
DO YOU SELECT DISTRIBUTION OF AGE OF INSURED PERSONS?  YES  NO
DO YOU DISTRIBUTE COUNTRIES OF INSURED PERSONS?  YES  NO
SELECT ITEMS FROM THE FOLLOWING KEY ITEM LIST.

| DECEASE LIST | INSURANCE COMPANY RANK | AGE OF INSURED | | COUNTRY OF INSURED |
|---|---|---|---|---|
| ・CANCER | ・RANKING BY AM BEST CORPORATION | 20~30 | B | |
| ・HEART DECEASE | ・B+ OR ABOVE ONLY | 31~40 | C | |
| ・BRAIN APOPLEXY | ・B+ OR UNDER IS AVAILABLE | 41~55 | D | |
| ・AIDS | ・RANDOM | 56~65 | | |
| ・LEUKEMIA | ・NONE | | | |
| ・DIABETES | | | | |

DO YOU REINVESTIGATE AN ANNUAL DIVIDEND?  YES  NO  BOTH
DO YOU DESIRE CASH BACK?  YES  NO  BOTH
CASH BACK 100%   REINVESTIGATION 0%

FIG.13

PURCHASER ID  ABK  12345  XYZ PENSION FUND
SET EXPIRATION DATE (6) YEARS  DESIRED MINIMUM DIVIDEND NOT LESS THAN [5] %  STABLE TYPE
INVESTMENT AMOUNT  200 MILLION YEN  TODAY'S EXCHANGE RATE OF 1 DOLLAR
A PORTFOLIO SATISFYING YOUR DESIRE IS CREATED.

| ESTIMATED REMAINING LIFE | INVESTMENT AMOUNT | RATIO | FIXED ANNUAL INTEREST RATE | SCHEDULED DIVIDED RATE | SCHEDULED DIVIDED MONEY |
|---|---|---|---|---|---|
| 1-YEAR COURSE | | | | | |
| 2-YEAR COURSE | 40 MILLION YEN | 20% | 28% | 14% | 11.2 MILLION YEN |
| 3-YEAR COURSE | 80 MILLION YEN | 40% | 42% | 14% | 33.6 MILLION YEN |
| 4-YEAR COURSE | 60 MILLION YEN | 30% | 50% | 12% | 30.0 MILLION YEN |
| 5-YEAR COURSE | 20 MILLION YEN | 10% | 60% | 12% | 12.0 MILLION YEN |

100 % OF ANNUAL DIVIDEND IS CACHED BACK OPERATION STYLE = STABLE TYPE

TOTAL CAPITAL 2 MILLION DOLLARS + SCHEDULED RETURN 7.56 MILLION YEN
= 275.6 MILLION YEN / 6 YEARS = 11.6 % (ANNUAL DIVIDEND)

REFERENCE DATA: CAN BE REFERENCED FROM DATABASE.  IS A PORTFOLIO ESTABLISHED ?  YES  NO

DECEASE DISTRIBUTION 3
CANCER, LEUKEMIA, HEART DECEASE

INSURANCE PERSON'S AGE
D, E

INSURANCE PERSON'S COUNTRIES
USA, JAPAN, UK

INSURANCE COMPANY RANK
AM BEST STANDARD, B+

PAYMENT CONDITION OF
INSURANCE COMPANY
100% PAYMENT

- DIAGNOSTIC DATA OF DOCTOR RELATED TO VIATICAL AND LIFE SETTLEMENT POLICY OF INSURED
- STATISTICS AND MEAN VALUE OF TYPES OF DECEASE AND AGES
- DECEASE CONDITION DATA OF INSURED PERSONS OF LIFE SETTLEMENT POLICIES
- STATISTICS AND MEAN VALUES OF PAST LIFE SETTLEMENT POLICIES
- DIAGNOSTIC DATA OF GENE (DATA ANALYSIS) DOCTOR
- IMMUNITY DIAGNOSIS (PROGRESS OF RECOVERY AND RESISTANCE)

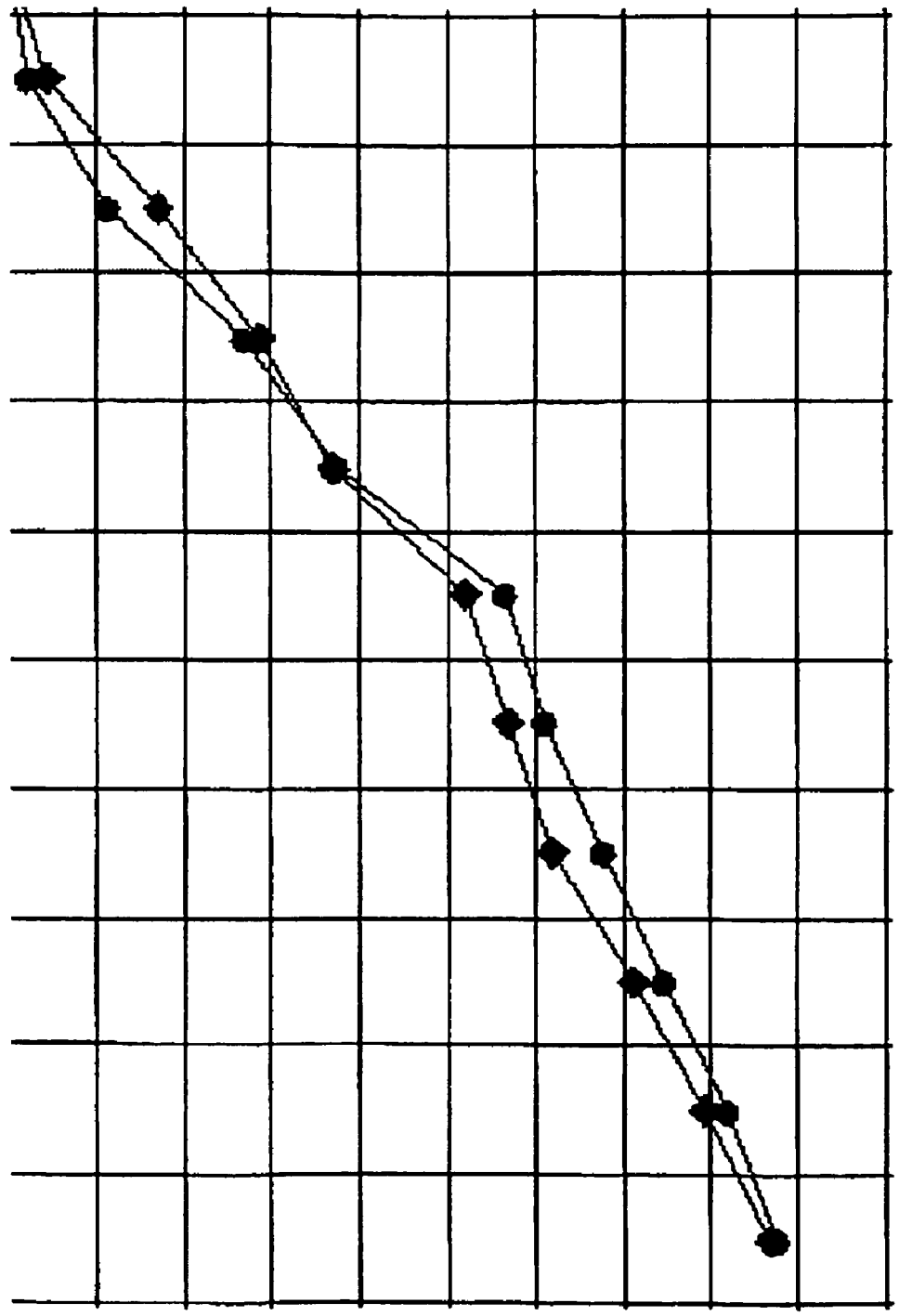

FIG.16
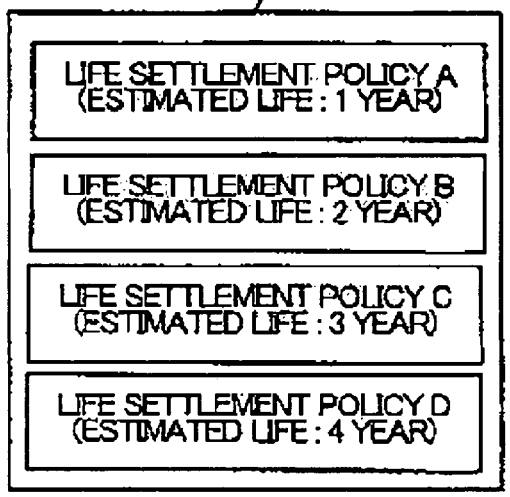
METHOD OF FORMING CONVENTIONAL LIFE SETTLEMENT POLICY COMPOSITE COMMODITY
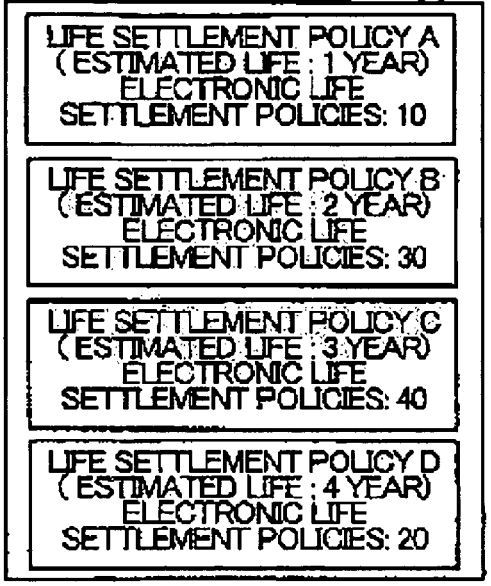
METHOD OF FORMING LIFE SETTLEMENT POLICY COMPOSITE COMMODITY ACCORDING TO PRESENT INVENTION
A LIFE SETTLEMENT POLICY IS DIVIDED INTO 100 ELECTRONIC LIFE SETTLEMENT POLICIES THEN FORMED IN UNITS OF STOCKS.
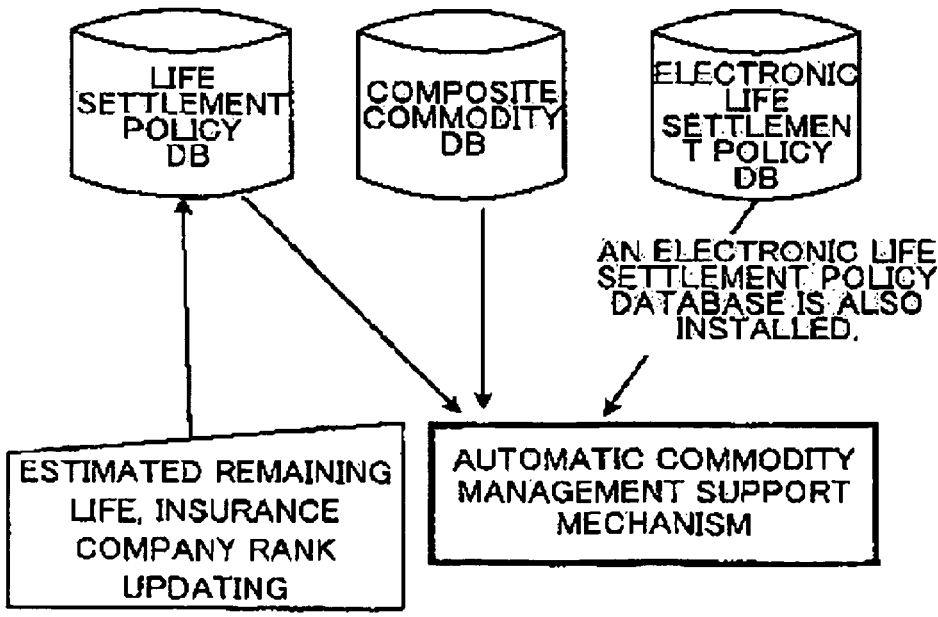

AUCTION SYSTEM AND SYSTEM OF FORMING INVESTMENT TRUST AND FINANCIAL PRODUCTS AND FUNDS INCLUDING VIATICAL AND LIFE SETTLEMENT

CROSS-REFERENCE TO RELATED APPLICATIONS

The present patent application is a division of application Ser. No. 11/077,038, filed Mar. 11, 2005, now abandoned which is incorporated herein by reference in its entirety.

BACKGROUND OF THE INVENTION

1. Field of the Invention

The present invention relates to a remote auction system using a computer network and a securities exchange system operated by the remote auction system. More specifically, the present invention relates to the division (making electronic stocks) of rights/obligations of properly and automatically adjusted transaction prices of securities related to a life settlement policy.

2. Related Art

Many conventional online auction systems allow a number of people to participate in auctions without imposing any limitation on the number of people. Accordingly, even a bidder having insufficient funds to purchase a commodity or a seller or a bidder having his/her name registered on a black list because of illegal actions in past auctions can participate in an auction. Further, since it is difficult for one person to buy an expensive commodity through an online auction, there is a need for a system to allow the purchase of such a commodity by a plurality of people. However, there is no mechanism available to provide a service for sharing proprietary rights by an unspecified number of participants according to their invested amounts.

High-price commodities each shared by a plurality of purchasers include not only a physically existing "article", but also a life settlement such as a viatical and a life settlement or an obligation to pay insurance. It is a matter of course that there has never been a mechanism for providing a service to make it possible to share a life settlement policy. In order to further understand the present invention, the right to receive insurance money (from viatical and life settlement policies) will be described.

As can be seen in many cases in the USA where medical costs are high, low-income Americans have difficulties paying monthly insurance premiums and many middle class Americans (hereinafter referred to as the "insured") have difficulties paying expensive medical fees are often told by a doctor that the estimated remaining life span of the insured is short due to disease.

In this case, the insured is continuously undergoing medical treatment in his/her lifetime by selling the insurance proceeds to be received after the insured dies. That is, the price of the viatical and life settlement insurance policy is determined according to the assumption of the estimated remaining life span of the insured calculated by the doctor. Then, the insured asks a person having a right to receive the insurance money after the death of the insured (a family member or the like) to waive the right, and the insured sells the right to a purchaser to receive the insurance money. In fact, receiving a portion of the insurance money in advance eases the economic distress of the insured and helps the insured to live better during his/her remaining years.

However, there is no institution or system for fairly judging the accuracy of a market price of a viatical or a life settlement insurance policy based on an assumption concerning the estimated remaining life span of an insured calculated by a doctor. Further, there has not been provided a mechanism for sharing a viatical and life settlement policy by an unspecified number of persons while ensuring the fairness of the viatical and life settlement policy. Under such circumstances, there are problems regarding a viatical and life settlement insurance policy from respective viewpoints of the insured, the medical field and the purchaser.

(1) Problem for Insured:

When an insured attempts to sell a viatical and life settlement policy regarding the person's own estimated remaining life span calculated by a doctor, the insured tries to contact a purchaser via an agency (insured→agency→purchaser). On the other hand, an institution or an assessment system serving as a so-called "board of fair trade" for judging the appropriate price of each viatical and life settlement insurance policy does not exist and an accurate market price of the viatical and life settlement insurance policy is therefore always unclear.

Consequently, many agencies deliberately estimate the price of a viatical and life settlement insurance policy by making use of the facts that there is no appropriate market price of the viatical and life settlement policy and that insured persons desire to receive insurance money as soon as possible. The price of a viatical and life settlement policy according to the estimated remaining life span calculated by a doctor can be determined based on a standard price set and changes made optionally by each agency in order to purchase the viatical and life settlement policy at an unreasonably low price, and the insured and his/her family members put up with the low price. Further, even when the insured is aware of the injustice and files an official complaint, the agency is not accused of violation of the Securities Act because the viatical and life settlement policy is not a negotiable instrument. As a result, a social problem arises in that the insured and his/her family members cannot make any complaint but reluctantly accept the unreasonably low price of the viatical and life settlement policy.

(2) Problem for the Medical Field:

When the insurance of an insured person (a patient) is canceled because of an unpaid insurance premium, payment of medical bills such as treatment fees, hospitalization fees and surgery fees are likely to be delayed. Accordingly, there has been an actual case where a hospital has no choice but to stop treating the insured (the patient) in order to collect the unpaid medical fees and prevent further accumulation of unpaid medical fees.

However, strict application of this rule results in abandonment of the patient who is unable to pay the medical bills, and this leads to a moral dispute in the medical field. On the other hand, there is another problem of nonexistence of means to pay expensive fees to a doctor, regularly prepare compensation for medical accidents, and collect unpaid medical fees. Actually, medical fees not paid by patients often become bad debts. Accordingly, there has been desired a quick solution for sound hospital management without interrupting medical treatment on a patient who has unpaid medical bills. One example of a problem to be solved is that prudent hospital management cannot be realized without the foregoing system for purchasing viatical and life settlement policies.

(3) Problem for the Purchaser:

As described above, the insured can contact the purchaser via the agency. The purchaser needs to contact the insured via the agency (the purchaser→the agency→the insured). That is, anonymity can be maintained during communication between the insured and the purchaser so that only the agency can transfer information exchanged between the insured and the purchaser. Accordingly, it is possible for the agency to deliberately manipulate the information and incorrectly disclose the information required for investment in the viatical and life settlement policy. Consequently, a problem arises in that sales are carried out in such a manner that the agency gives only favorable information to the purchaser and hides unfavorable information.

In addition, according to the basic structure of the conventional viatical and life settlement policy, the longer the insured lives, the less the purchaser collects. Therefore, the purchaser may not want the insured to live for a long time. For example, the possibility cannot be denied of killing the patient who lives longer than the estimated remaining life span. Further, any family member of the insured might claim the viatical and life settlement policy once waived at the time of payment of the insurance money to the purchaser after the insured has died, and demand the insurance money from the purchaser or harass and annoy the purchaser. For the above reasons, it is essential that a trade between the insured and the purchaser is carried out indirectly via the agency with anonymity maintained so that the insured and the purchaser do not know each other.

Thus, the conventional viatical and life settlement system is enabled by purchase and resale activities by the agency instead of direct trade between the insured (the patient) and the purchaser. Thus, it is easy for the agency to perform illegal mediation yet there is no organization to supervise such an illegal action. Accordingly, many dishonest actions are carried out by agencies taking advantage of the deficiency of the rule. Accordingly, the correct and appropriate market price of the viatical and life settlement policy needs to be calculated and a fair trade needs to be carried out between the purchaser and the insured based on the market price instead of the conventional way of estimating the price of the viatical and life settlement policy based on the agreement between the doctor and the agency.

Even when a fair trade can be directly carried out between the purchaser and the insured based on the appropriate market price, the insured might need to use a pseudonym for his/her personal information (including a name, an address, a contact destination and the like wherefrom the insured is identifiable) so that the personal information is not disclosed by negligence unless a written consent agreed by the insured and his/her family members exists. Further, a direct fair trade between the purchaser and the insured while obtaining each other's personal information and correlating the personal information with the appropriate market price by adding unique IDs to the purchaser and the insured to identify each other or encrypting the IDs.

SUMMARY OF THE INVENTION

Accordingly, in view of the foregoing problems, an object of the present invention is to provide a commercial transaction system and a method of making it possible to transparently and fairly disclose an optional life settlement policy exchanged between a seller and a purchaser to all persons or institutions concerned in the trade of the life settlement policy in addition to the seller and the purchaser.

In the auction system according to the present invention, an auction trade between a seller and a bidder via a communication network is mediated by an auction management system. The auction management system comprises: an information receiving means for receiving information transmitted from the seller and the bidder; a login confirmation means for verifying whether or not the seller or the bidder attempts to login using already-distributed key information; an account confirmation means for confirming whether or not the seller or the bidder has a life insurance commodity account applicable for online settlement, from which charges can be withdrawn; and a trouble confirmation means for confirming whether or not the seller or the bidder has not made payment of a fee or carried out any illegal action at a past auction trade.

In the auction system according to the present invention, an auction trade related to a viatical and life settlement policy between an insured and a purchaser via the communication network is further mediated by the auction management system. The auction management system comprises: an information receiving means for receiving information transmitted from the insured and the purchaser; a login confirmation means for verifying whether or not the insured or the purchaser attempts login using already-distributed key information; an account confirmation means for confirming whether or not the insured or the purchaser has a life insurance commodity account applicable for online settlement from which charges can be withdrawn; a trouble confirmation means for confirming whether or not the seller or the bidder has not paid a fee or has carried out any illegal action in a past auction trade by reading information from a storage means; an appropriate price calculation means for calculating an appropriate price of the viatical and life settlement policy based on the amount of insurance carried by the insured, the estimated remaining life span of the insured calculated by a doctor, the insurance premium due to be paid by the insured, the interest rate of an investment trust institution, and the annual interest rate of the viatical and life settlement policy; and an automatic patrol means for identifying an illegal action in the form of reading a process of auction trade carried out by the insured and the purchaser from the storage means and comparing the read process to that of a current trade.

The investment trust, financial products and funds formation system according to the present invention includes a plurality of viatical and life settlement policies of which prices are set based on estimated remaining life span information of insured persons calculated by doctors. The investment trust and financial products formation system comprises: an input means for inputting the remaining estimated life span information of the insured calculated by a doctor; a storage means for storing the input estimated remaining life span information into a storage medium; an estimated remaining life span error calculation means for reading the estimated remaining life span information stored in the storage means and comparing the read remaining life span information to remaining estimated life span information newly inputted by the input means to calculate error information of the estimated remaining life span; and a commodity, financial products and funds constitution changing means for changing the constitution of the investment trust, financial products and funds when the error information of the estimated remaining life span exceeds a predetermined threshold value.

The auction system according to the present invention is constructed so as to verify whether or not a seller or a bidder attempts login using already-distributed key information, has a life insurance commodity account applicable to online settlement wherefrom charges can be withdrawn, or has shirked payment of a fee or carried out any illegal action during an auction trade between the seller and the bidder via a communication network. Accordingly, it is possible to check if the seller and the bidder are qualified to participate in the auction so that the occurrence of problems, such as not making a payment of a fee, can be greatly reduced.

Further, the auction system according to the present invention is formed so as to calculate an appropriate price of a viatical and life settlement policy based on the insurance amount carried by an insured, the estimated remaining life span of the insured calculated by a doctor, the insurance premium to be paid by the insured, the commission fee of an investment trust institution and annual interest of the viatical and life settlement policy in the auction system, so that it is possible to prevent the viatical and life settlement policy from being set at an unreasonably low price. Accordingly, the insured can sell the life settlement policy at an appropriate market price while fairness of the trade is maintained.

The investment trust and financial products formation system according to the present invention is formed so as to calculate an error in remaining life span information of an insured which has been updated by comparing the same to already-stored remaining life span information, and when the calculated error exceeds a predetermined threshold value, change the constitution of the investment trust and financial products. Accordingly, it is possible to simulate the operation on the investment trust and financial products based on the current and correct error data so that a customer's risk can be reduced.

BRIEF DESCRIPTION OF THE DRAWINGS

FIG. 11 is a view showing an example of a screen showing the specifications wanted by a customer who desires to purchase the composite life settlement policy in the life settlement policy formation system.

FIG. 13 is a view showing an example of an input screen displayed when a life settlement policy commodity with a fixed return and an annual dividend (return) is cashed back, wherein the purchase amount of the viatical and life settlement policy is fixed.

FIG. 14 is a view showing an example of a statistical graph displayed when a specific key item among analytical data key items shown in FIG. 13 is clicked.

FIG. 16 is a conceptual drawing showing the creation/operation of an electronic stock of the viatical and life settlement policy in the life settlement policy formation system.

DETAILED DESCRIPTION OF THE PREFERRED EMBODIMENTS

Preferred embodiments of the present invention will be described hereunder with reference to accompanying drawings.

First Embodiment

Entire Configuration of Online Auction System

Figure 1:
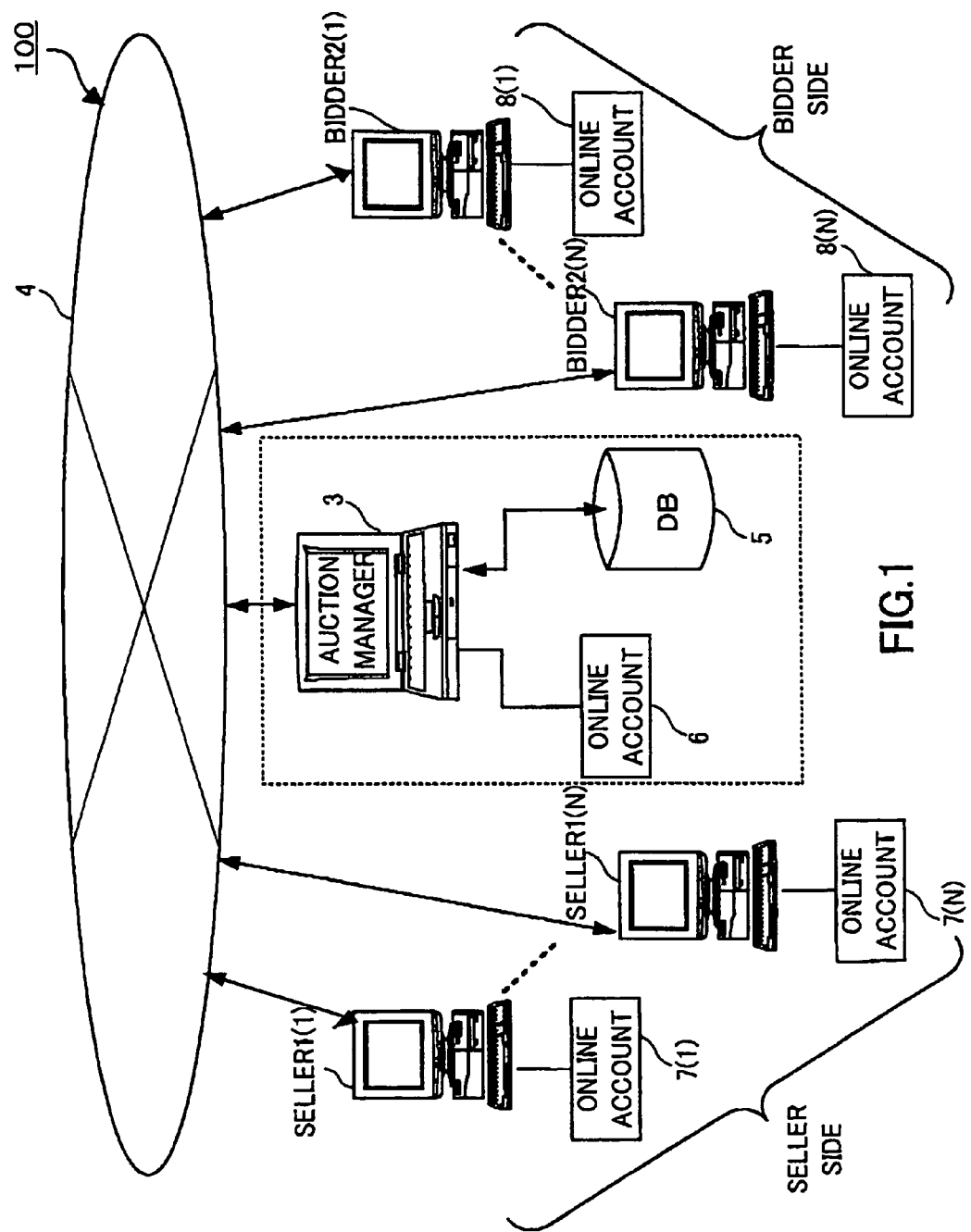
FIG. 1 is a schematic view showing the structure of an online auction system of one embodiment according to the present invention.

FIG. 1 is a schematic diagram showing a configuration of an online auction system 100 (hereinafter abbreviated as "auction system 100"). As shown in FIG. 1, the auction system 100 allows a person who desires to purchase a commodity (life insurance) auctioned by a seller and to participate in an auction as a bidder. A bidder who offers the highest price for the commodity can successfully bid and purchase the commodity.

The auction system 100 according to the present invention is constructed so that a terminal device 3 (for use by an auction manager) is connected to a database 5 and terminal devices 1(1) to 1(n) of a plurality of sellers (the sellers and the terminal devices thereof are hereinafter assumed to be the same and represented by a seller 1(x)), and terminal devices 2(1) to 2(n) of a plurality of bidders (the bidders and the terminal devices thereof are hereinafter assumed to be the same and represented by a bidder 2(x)) can be interconnected via a network 4.

A terminal device 3 is for management and operation to carry out normal and smooth trading between the seller 1(x) and the bidder 2(x). The auction manager has an online account 6 in an optional banking facility. The online account 6 is accessible from a terminal device 3 for the auction manager. The terminal device 3 for the auction manager accesses the database 5 to obtain information required for the auction or information about a trade between the seller 1(x) and the bidder 2(x) after the conclusion of the auction. Further, the terminal device 3 for the auction manager distributes key information for the seller 1(x) and the bidder 2(x) to log into the auction system 100. The terminal device 3 is not necessarily limited to one, but a plurality of terminal devices 3 may be connected to the system.

The seller 1(x) is an information terminal device on the seller side for participation in the auction system 100. The bidder 2(x) is an information terminal device on the bidder side for participation in the auction system 100. The type of either terminal device is not particularly limited so far as the same is an information terminal device capable of accessing the communication network 4. Specific examples of the information terminal devices usable herein include a desktop computer, a laptop computer, a notebook computer, a handy computer and a Personal Digital Assistant (PDA).

The detailed structures of these terminal devices 3, 1(x) and 2(x) will be described later. However, it is clear to those skilled in the art that each of these terminal devices includes a data processor or a Central Processing Unit (CPU), a memory, a user interface, a communication interface circuit and a path.

Further, the seller and the bidder have online accounts 7(x) and 8(x) accessible from the seller 1(x) and the bidder 2(x), respectively, in optional banking facilities. A commodity charge is paid from a successful bidder (x) to a seller (x) via the online accounts 7(x) and 8(x) after the conclusion of an auction. Furthermore, the seller and the bidder need to pay the auction manager a fee to participate in the auction, a commission fee on making a deal and the like. These fees are also transferred to the online account for the auction manager from online accounts 7(x) and 8(x).

Although details of the database 5 will be described later, the database 5 stores various types of information about at least the seller 1(x) and the bidder 2(x). For example, the database 5 stores an opening condition, an auction history, a bidding history and the like correlated with the seller and the bidder.

The communication network 4 interconnects the seller 1(x) and the bidder 2(x) with the terminal device 3 for the auction manager. It is possible for the communication network 4 to be interconnected with another network (not shown) and to include a sub-network (not shown). The communication network 4 is realized by, for example, a Local Area Network (LAN), a Metropolitan Area Network (MAN) or a Wide Area Network (WAN).

Further, the communication network 4 does not specify the type of access service (e.g., a Public Switched Telephone Network [PSTN]), an Integrated Service Digital Network [ISDN], a Digital Subscriber Line System [DSL], or an Asynchronous Transmission Mode [ATM]). In addition, the communication network 4 does not specify a protocol (e.g., a Wireless Access Protocol [WAP], a Transmission Control Protocol/Internet Protocol (TCP/IP), a NetBIOS Extended User Interface [NetBEUI], or Internet work Packet Exchange/Sequence Packet Exchange [IPX/SPX]).

Entire Operation of Auction System

Figure 2:
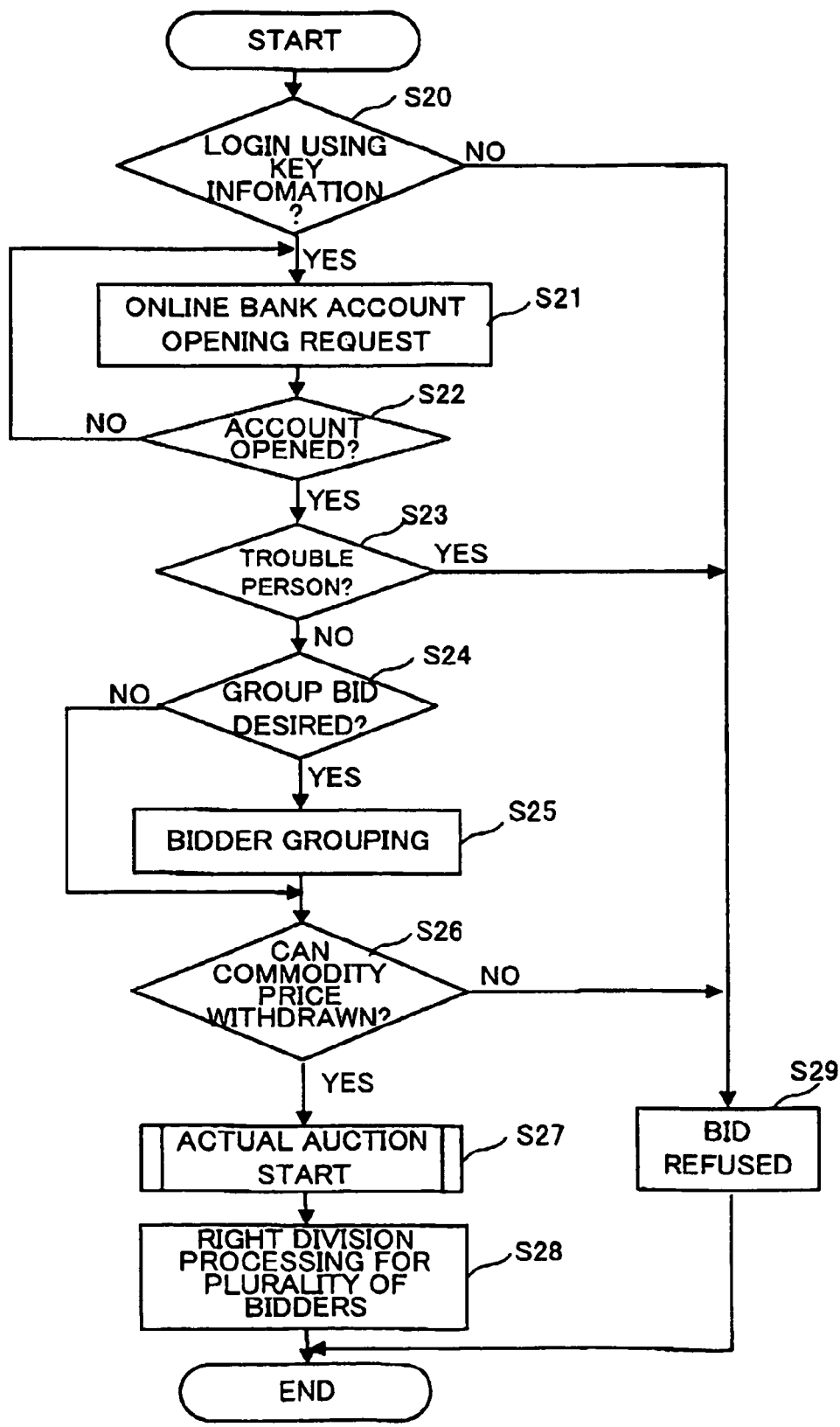
FIG. 2 is a flowchart showing procedures for the entire operation of the online auction system of one embodiment according to the present invention.
Figure 6:
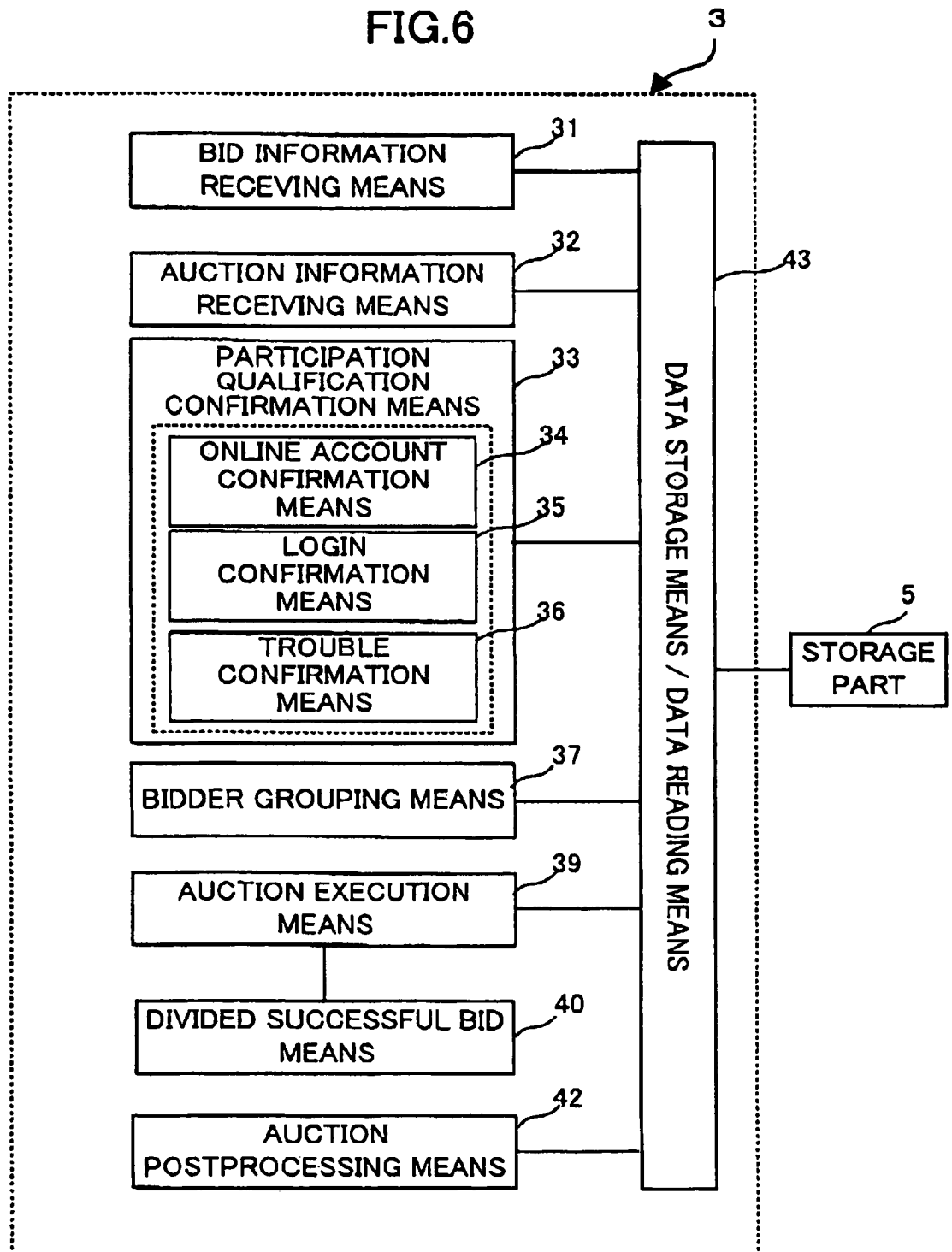
FIG. 6 is a block diagram showing a processing means of a terminal device for managers who operate and manage the online auction system of one embodiment according to the present invention.

The entire operation of the auction system 100 will be described next. FIG. 2 is a schematic flowchart showing procedures for the operation of the auction system 100. FIG. 6 is a block diagram showing the processing steps of the terminal device 3 for the manager. In addition, components that are not directly related to the present invention such as a means for outputting data to a monitor screen are omitted in the figures and the descriptions. However, these components are included in the system.

With reference to FIG. 6, the auction system 100 includes a participation qualification confirmation means 33 comprising an online account confirmation means 34, a login confirmation means 35 and a trouble confirmation means 36, and automatically complies with rules at the time of the auction trade. Accordingly, the purpose of compliance (significance of existence) will be described in detail.

Automatic compliance is necessary to accomplish the following purposes:
1. Normally and fairly carry out a trade according to the relevant laws.
2. Control and prevent money laundering and trade with a questionable fund to be investigated with regard to money laundering.
3. Prevent the malicious use of an account provided by this system for the purpose of an illegal or a criminal action and to take precautionary measures to control malicious use.
4. Check for an unfair or an illegal trade to be registered in a black list, such as a trade in which a plurality of bidders cooperating in the auction time to time deliberately raise the price, and give the bidders warning. If the bidders repeat the illegal trade after a warning is given, the bidders are registered in the black list and deprived of any participation right.
5. In order to authenticate an individual more accurately, a purchaser (a successful bidder or an auction participant, i.e., a purchaser or a financier) who carries out a trade must be a person qualified to carry out a trade in the system. Because of the danger of money laundering and the law to control the same, the sources of the funds and the income of the person must be legal. There is a major premise that if a third person borrows an account and an ID of another person to disguise their identity, the other person must not be concerned in a trade. Accordingly, only an authorized person must hold/manage an account and carry out a trade in the system.

Accordingly, in any case, a disguised bidder must not participate in the trade. It is an important object in an online trade or auction not to grant any participation rights to a person identified as causing a compliance problem or a person having his/her name registered in the black list in the first place, because such a person interferes with fair trade.

Accordingly, when the auction information receiving means 32 and the bid information receiving means 31 (see FIG. 6) of the terminal device 3 detect a login from the seller 1(x) and the bidder 2(x), the login confirmation means 35 checks if the seller 1(x) and the bidder 2(x) log into the auction system 100 by using key information and then allows or refuses logging into an auction (Step 20 in FIG. 2). The key information is preferably unique information for each category or item of a commodity treated at auction. The seller 1(x) and the bidder 2(x) need to obtain the key information from the auction manager before participating in an auction. In addition, in order to prevent key information from being leaked illegally to a third person, the terminal device 3 can distribute the key information to the seller 1(x) and the bidder 2(x) via a virtual leased line using a leased communication line or a Virtual Personal Network (VPN) without using a network open to the public (e.g., internet). Here, the auction information receiving means 2 and the bid information receiving means 31 together correspond to the so called "information receiving means".

Alternatively, automatic compliance may also be realized as follows. First, a request for auction approval to become a member to obtain a right to trade in a board of fair trade is sent (via the network, by facsimile or with a document) to the management bureau (company) of the system, followed by a compliance test and an investigation. The compliance test is specified by the SEC (the Securities and Exchange Commission of the USA) or a qualifying examination for a purchaser approved and specified by the Financial Supervisory Agency of Japan. The nucleus (a function for a basic idea of an action) of automatic compliance is a law. Accordingly, it can be said that the automatic compliance is specialized for the Securities Exchange Law, the Financial Instruments Sales Law and other laws, and all financial businesses and financial trades, and the automatic compliance makes use of a database including mainly all existing laws related to the financial businesses and financial trades. In addition, the database used by the automatic compliance means includes not only laws related to the financial businesses and financial trade in Japan, but also all laws of the USA related to finance such as the Federal Securities Exchange Law of the USA based on international finance, and all laws related to financial businesses and financial trades in 26 principal countries including the UK, China, the Euro economic zone, Taiwan and Canada. The automatic compliance functions according to the above laws as a basic idea. If an action or a trade contrary to any law is found, the automatic compliance means checks and observes the action or trade, and when, for example, the volume of trade increases rapidly, automatically sends mail to purchasers if necessary.

Thereafter, a person recognized as a large debtor by a debtor association, a wanted person or a person registered in a black list of a financial institution or a credit card company, is excluded from the auction. When the purchaser who is approved for opening an account passes the compliance test for dealing in viatical and life settlement policies or other commodities at auction of this system (board of fair trade), the purchaser becomes a member of the system and is given a dedicated account, and a card and a card reader for identifying himself/herself.

The purchaser who has passed the compliance test participates in the auction system 100 in accordance with the following procedures:

Procedure 1: The purchaser who has passed the compliance test is given a card for identifying himself/herself. This purchaser may be a purchaser, a successful bidder, an auction participant or a founder. However, the word "purchaser" used herein is a generic name for the above relevant persons. The card can be identified with, for example, a 16-digit number. In addition, purchasers are first classified into "purchasers with cards" and "purchasers without cards". Cards of the purchasers with cards are classified into the following three types:

(a) A card having an additional function of a credit card such as VISA, MASTER or the like. (This card is sent to a purchaser having a specific credit according to a past trade history to whom a credit card can be issued, when requested by the purchaser.)
(b) A card which can also be used as a debit card. (A system which allows cashing of 50% of savings in an account with an ATM is provided.)
(c) An individual authentication card for participation in auctions (and the board of fair trade). (This card functions as neither a debit card nor a credit card and is simply provided to a person who has passed the compliance test of the system and is granted a participation right. According to the rules of the system, this driver's license-like card needs to be read by the card reader each time the card owner participates in a trade.)

The purchaser without a card is a purchaser who does not desire to purchase a set of cards and have the cards read in advance yet desires to participate in auction. For such a purchaser, the upper limit of a volume of trade is set as low as two to three hundred thousand yen so that the purchaser can deal within this range. In other words, it is assumed that it is often impossible for the purchaser to purchase or successfully bid a beneficial commodity (including the life settlement policy) and hence the purchaser often registers himself/herself on a waiting list.

Procedure 2: The card reader connectable to the terminal device (PC) of the purchaser is installed to read the card when the purchaser participates in an auction.

Procedure 3: Data sent to the network is encrypted to enhance security management.

Procedure 4: Further, in order to thoroughly eliminate the case where the card is sold to a third person and the third person who essentially has no participation right thus can participate in auction, secondary (additional) individual authentication is carried out. This individual authentication is to correctly identify an individual with a device for instantaneously reading the physical information of the purchaser (e.g., a fingerprint, a voice, identification of DNA in sputum or a hair [by a halogen light or a laser beam], and information about a measured volume of a hand or a face) when the purchaser logs in the terminal device. This apparatus is however generally expensive and hence identification of a fingerprint, an iris or DNA is preferable. In addition, it is clear that the details of these techniques are already known.

Procedure 5: Since an individual authentication number of each purchaser is stored in the database 5 of the auction system 100, when the authentication number of Mr./Ms. RM is A1234567, and the individual is authenticated only when this number matches the number read from the card that has been granted to Mr./Ms. RM, the purchaser is authenticated by the card reader. Mr./Ms. RM can thus participate in auction trades (the board of fair trade). In addition, the individual authentication number is not changed in principle (except in the case where the system manager wants and instructs to change the individual authentication number).

Procedure 6: The card is automatically updated to a card having a new number at each predetermined time period based on a trade history and the credit of each purchaser. This procedure is a measure for further preventing the card from being given to a third person resulting in the malicious use of the account by the third person. In this case, the terminal device 3 automatically updates the information of the updated card number and stores the updated information in the database 5.

Procedure 7: When the purchaser participates in an auction after the above procedure, matching between the new card number read from the purchaser's card and the individual authentication number stored in the database 5 is verified to identify the purchaser having the new card number as himself/herself.

The person in question is authenticated in accordance with the above procedures. The system manager (company) per se performs the nucleus function of the compliance and bears an obligation of entire transaction to control the normal operation of the whole system. For this purpose, in the first compliance test, the system manager (company) preferably investigates major criminal records of the purchaser or whether the purchaser has been registered in the black list of any banking facility in addition to the automatic investigation.

In particular, the cards used in the auction system 100 preferably have the following features:

1. Purchasers are ranked by the colors of the cards (e.g., silver, gold, and platinum). Each card color is determined according to a purchaser's income, a fund constantly prepared in an account and the social credit of each purchaser. In principle, a purchaser having a card of any color can purchase any high-price commodity or any viatical and life settlement policy alone or with other purchasers within the amount of a balance remaining in the account. Further, unlike the usual credit card, the purchaser is not upgraded by paying a higher annual member fee, and cannot determine the card color by himself/herself according to his/her intention, desire or purchasing power. The card color is unilaterally determined based on "a social credit", "a constant income", "a balance and an assets power", "evaluation of other banking facilities" and "a total amount of successful bids and the number of times the purchaser uses the card" determined by the compliance means of the auction system 100. Further, when the purchaser is assumed to be a good purchaser based on the number of trades, the number of successful bids and statistics of amounts, the card color is naturally changed to a color representing a higher rank. However, if the purchaser carries out any illegal action such as "being a by-bidder" or "deliberately raising a price", the purchaser is not authorized as an approved purchaser because of the violation of the rule even when the volume of a trade and the number of times the purchaser uses the card are "good".

2. For the purchaser who carries out legal trades without being a "by-bidder" or "deliberately raising a price" and is not involved in any illegal action with others, the specific number of points are given and summed up when the trade history exceeds a specific time period. Then, when the number of points exceeds a specific value, the card color can be upgraded. However, upgrading to the silver color or higher is not possible under a simple condition that the purchaser is not involved in an illegal action.

3. Points of the card are added regardless of a credit or illegal trade of the purchaser. The points are summed up according to the number of times the purchaser uses the card, the number of successful bids, the amount of a final successful bid, the investment amount in each trade and accumulated investment amounts in trades. The card is then automatically updated. The number of points is a value indicating an evaluation and a credit of each purchaser in the auction system 100. However, the points shall not to be accumulated for the purpose of being exchanged for money.

4. A specific alias such as a plant name is given to the purchaser showing a special tendency or action pattern to identify the purchaser and the information thereof is inputted to the card. The special tendency and action pattern signifies a particular way of investment by the purchaser in all trades. More specifically, the particular way signifies that the purchaser participates in many trades, but makes few successful bids or bids an amount that is too low to make successful bids through all trades.

5. More points are summed up to identify the purchaser according to his/her rank based on the average upper limit at which the purchaser stops trading in every trade.

Next, the terminal device 3 further checks if the seller 1($x$) and the bidder 2($x$) who has logged in using the key information obtained from the terminal device 3 (from the manager— by the participation qualification confirmation means 33) are qualified to participate in the auction system 100. More specifically, the seller 1($x$) or the bidder 2($x$) who desires to participate in an auction is requested to open online accounts 7($x$) and 8($x$) by the online account confirmation means 34 (Step S21). When these online accounts have not been opened, the online account confirmation means 34 keeps requesting them to open the accounts (Step S22).

Next, the terminal device 3 further searches the history of auctions up to the present time for the bidder 2($x$) who desires to participate in the bid with the trouble confirmation means 36 to check if the bidder has caused any problems including monetary trouble (Step S23). The past conditions of the seller 1($x$) may also be checked in addition to the history of the bidder 2($x$). For example, the auction history of the seller 1($x$) is searched to check if the seller 1($x$) has caused any trouble related to the commodities auctioned so far. This information is accumulated in the database 5 and can be searched from the terminal device 3 by the manager.

Figure 3:
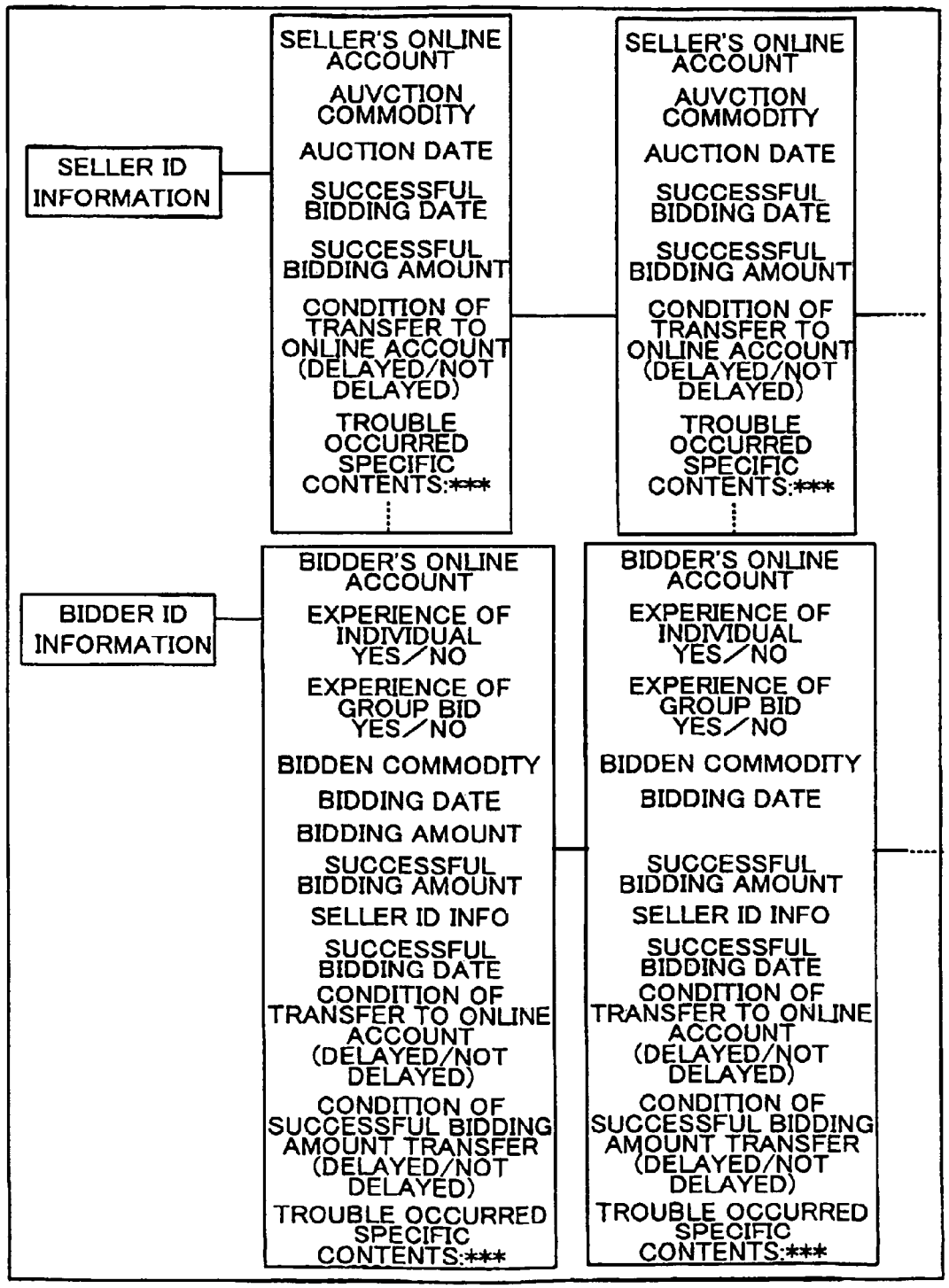
FIG. 3 is a view showing an example of a data structure of a database in the online auction system of one embodiment according to the present invention.

FIG. 3 shows an example of a data structure for the database 5. As shown in FIG. 3, seller ID information to identify a seller 1($x$) that is permitted to participate in the auction system 100 and bidder ID information to identify the bidder 2($x$) correlated with online account information and auction history information (a sole source bid, a group bid, an auctioned or successfully bidden commodity, auction or bidding date and time, successfully bidding date and time, a transfer condition of a successful bidding amount, a condition of payment to a management account, details of trouble and a history of illegal raising of a successful bidding amount [by the seller disguising as a bidder]) of the seller 1($x$) and the bidder 2($x$) are stored. The trouble confirmation means 36 can specify the seller ID information from the seller 1($x$) to obtain the problem history of the seller 1($x$). Likewise, the trouble confirmation means 36 can specify the bidder ID information from the bidder 2($x$) to obtain the problem history information of the bidder 2($x$).

When it is assumed that the seller 1($x$) or the bidder 2($x$) has caused any trouble in Step S23, the trouble confirmation means 36 refuses to make a bid by the seller 1($x$) and the bidder 2($x$) (Step S29). In the alternative, when no past trouble is found, a bidder grouping means 37 of the terminal device 3 then specifies whether the bidder 2($x$) has made a sole source bid or a group bid (Step S24). This step will be described in detail as follows.

First, the bidder grouping means 37 presents an input screen related to a desired specification item related to the bidder 2($x$) and has the bidder 2($x$) return the desired specification item marked with a check mark to the bid information receiving means 31. Specific examples of desired specification items include a commodity classification category, an ID of a commodity (scheduled) to be auctioned, a seller ID and the highest successful group bid price. The bidder grouping means 37 receives the desired specification items from the bid information receiving means 31, extracts surplus bidders 2($x$) above the specific number of bidders with desired items marked with check marks, and forms a virtual group (Step S25). The bidder grouping means 37 then presents the contents of specification items of the virtual group to the members of the virtual group. Each of the presented specification items is a logical product (AND) of items which frequently match other items within the group members. The bidder grouping means 37 has each group member return a response saying whether or not the member desires to participate in an auction in a group to prompt confirmation of whether the group member has the intention to make a bid regarding the specification items presented by the bidder grouping means. When the specific number (not less than two) of bidders 2($x$) who desire to participate in the auction as a group with the specification items are finally assembled, a group is formed of these bidders 2($x$) as group members.

The bidder grouping means 37 qualifies for a group bid and a group ID a plurality of bidders 2($x$) who have noted their desire to make a bid as a group. On the other hand, the bidder grouping means 37 qualifies to make a bid as an individual and an individual ID a bidder who has noted his/her desire to participate in the auction as an individual.

The bidder grouping means 37 sets investment ratios of the members preferably under an agreement of the members made at the time of grouping for bidders 2($x$) who have participated in the auction as a group (for example, 50% for Mr./Ms. A, 30% for Mr./Ms. B, 10% for Mr./Ms. C and 10% for Mr./Ms. D). Then, the final intention to make a bid is determined by the vote of the members to make certain that the members agree to the amount of the bid by the group of 50 million yen for a commodity currently priced at 49 million yen. At this time, the voting rights of the members may be weighted according to the foregoing investment ratios of the members. Communications between the members can be carried out separately from the auction manager. The terminal device 3 is however preferably able to generally manage information from the bidders 2(x).

Further, when the group makes a successful bid on a commodity, shares of proprietary rights are preferably determined according to ratios of shares (investment ratios of the bidders 2(x) within the group). Decisions are thus made in the unit of a group and the decision making by the group is reflected in the auction system 100. In addition, in this embodiment, making a bid as a group will be referred to as "auction bid by proxy" and the group will be referred to as "proxy auction bidder".

Next, the online account confirmation means 34 checks an online account 8(x) of the bidder 2(x) who desires to participate in a bid and confirms whether or not a commodity charge can be withdrawn (Step S26). The existence of a balance in the account is preferably determined according to the existence of the amount required for a successful bid in the case of an auction bid by proxy. At the auction bid by proxy however, every member need not have the amount required for a successful bid. As aforementioned, since an investment ratio is set for every member in the case of the auction bid by proxy, the online account confirmation means 34 may check whether it is possible to withdraw an amount obtained by multiplying the desired successful bid price by the investment ratio. However, the operation of the online account confirmation means 34 is not limited to this. (For example, according to the foregoing example of the investment ratios, the online account confirmation means 34 checks if 25 million yen or above remains in the account of Mr./Ms. A and 50 million yen or above remains in the account of Mr./Ms. B.) Further, when a proxy desires to make an auction bid, a proxy (group) formed of 10 on a commodity of 100 million yen, the online account confirmation means 34 may request a balance of ten million yen in the account of each member which makes the total amount in accounts of all member 100 million yen. When a commodity price exceeds a predetermined amount (e.g., 10 million yen) in the case of the auction bid by proxy, the online account confirmation means 34 may request a balance account of 30% in the case of the auction bid by proxy or 80% in the case of a sole source bid. Alternatively, the online account confirmation means 34 may always request a predetermined balance in the account(s) regardless of whether an auction bid by proxy or a sole source bid is made.

In addition, the confirmation of the balance in the account (s) is carried out at least at the time of making a bid. However, in the case of an auction requiring a long time from the start of a bid to a successful bid, it is safer to confirm the balance in the account(s) at an optional time interval (e.g., every few hours, every half day, every day, etc.). Further, the confirmation of the balance in the account(s) is applicable to a unit division system, which will be described later, along with other customary systems.

When the participation qualification confirmation means 33 determines that at least a required amount of saving is not deposited in the online account 8(x) of the bidder 2(x) who desires to participate in a bid and hence it is impossible to withdraw a bid price as a result of the confirmation of withdrawal in Step S26, the participation qualification confirmation means 33 refuses the bid (Step S29). In particular, when the participation qualification confirmation means 33 determines that the group is unqualified as an auction bid by proxy because any group member has insufficient funds, the participation qualification confirmation means 33 dismisses the group. In addition, when any group member is an object of refusal, the participation qualification confirmation means 33 may permit reorganization of the group excluding the object of exclusion from a bid, and inclusion of another member in the group.

Figure 4:
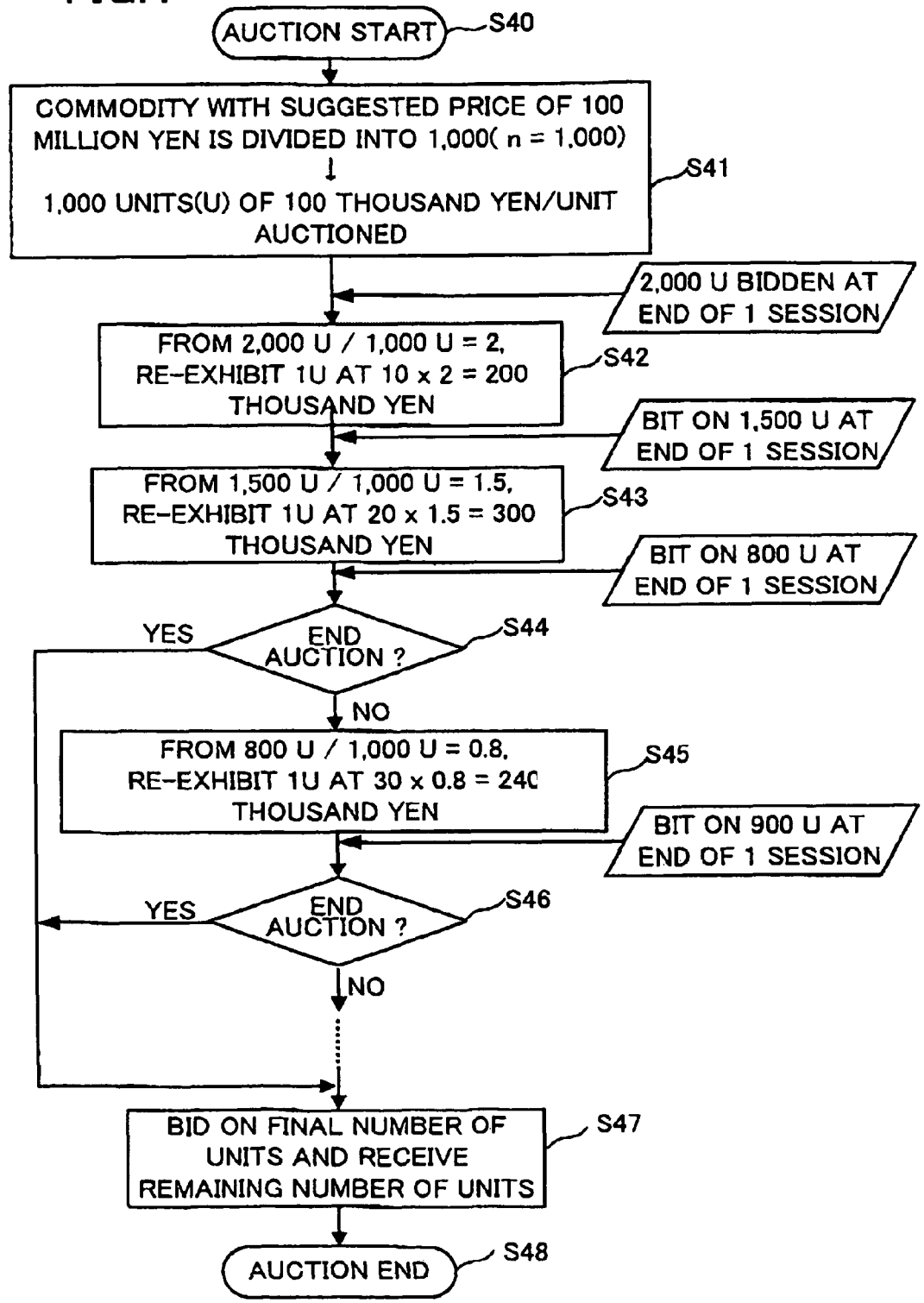
FIG. 4 is a view showing procedures of divided successful bids made by a plurality of bidders in the online auction system of one embodiment according to the present invention.

On the contrary, when the bid price can be withdrawn from the account(s), an auction execution means 39 starts an actual auction to determine a successful bidder after an ID (a commodity ID) is added to each commodity auctioned by the auction information receiving means 32 (Step S27). In one preferred embodiment, the auction system 100 is provided with a "proxy bid function" for integrating purchase requests from a plurality of bidders 2(x). That is, the conventional auction system is operated on the premise that a bidder is an individual, and a plurality of bidders are not assumed to make a decision together in a successful bid. The present invention makes it possible for a divided successful bid by a plurality of bidders. FIG. 4 shows the auction procedures for the divided successful bid.

Accordingly, a target commodity shown in FIG. 4 is physically dividable (e.g., an optional credit). The flowchart in FIG. 4 shows the process for dynamically dividing the target commodity into units when a plurality of sole source bids are made or an auction bid by proxy (group bid) is made. The divided auction is started by a START instruction from a divided successful bid processing means 40 (Step S40). Thereafter, the auctioned commodity is divided into n price units in Step S41. For example, a commodity of a suggested sales price as high as 100 million yen is divided into n=1,000 units. In this case, it is assumed that 1,000 units of commodities each of which costs 100 million yen are sold at auction. The value of the number of divided units n at the start of the auction can be set freely by the seller 1(x) or optionally by the divided successful bid processing means 40 according to the suggested sales price, or an appropriate number of divided units can be set according to a successful bid for a similar commodity in a prior auction.

In an auction, a predetermined time period is conveniently specified to be one session. When the predetermined time period expires and one session ends, 2,000 units, for example, are bid. That is, the auction system 100 accepts a bid of units desired to be purchased by all bidders even when the total number of units (n=2,000) exceeds the number of units (n=1,000) on sale. These 2,000 units are the sum of the number of sole source bids and the number of auction bids by a proxy (group bids). For example, one individual makes a bid for 100 units (10 million yen) and one group makes a bid for 1,900 units (19 million yen). In addition, the auction bid by proxy is treated as a sole source bid. Accordingly, the auction bid by proxy corresponds to the sole source bid on 1,900 units. Then, for instance, the auction bid by proxy makes a bid on 1,900 units, each member of the auction bid by proxy obtains his/her share out of 1,900 units.

At first, n=1,000 units on sale are auctioned and a bid is made on 2,000 units, which is twice as large as the number of released units, after the end of one session. Accordingly, it can be determined that an auction is successful even when a price of one unit is raised. Then, when the total number of units desired to be purchased by all members is more than the number of units (n) on sale, the divided successful bid processing means 40 re-sets a unit price to 100 thousand yen×

2=200 thousand yen according to an equation 2,000 U/1,000 U=2 then puts the units up again at auction (Step S42).

Again, a bid is assumed to be made on, for example, 1,500 units at the end of one session. In this case, in the same manner as in the above example, the divided successful bid processing means 40 sets a unit price to 200 thousand yen times 1.5=300 thousand yen according to an equation 1,500 U/1,000 U=1.5 (Step S43). Again, a bid is assumed to be made on, for example, 800 units. In this case, the number of units is less than the number of units on sale n=1,000. Thus, when the number of units desired to be purchased by all bidders is less than the number of released units, whether to close the auction or to lower a unit price, and then present the units again at an auction, is determined by a means which will be described later (Step S44). When the auction is not closed as a result of this determination, the divided successful bid processing means 40 lowers a unit price to 300 thousand yen× 0.8=240 thousand yen according to an equation 800 U/1,000 U=0.8 (Step S45).

Further again, a bid is made on, for example, 900 units at the end of one session. In this case, the number of units to be purchased by all members is less than the number of units on sale. Accordingly, a determination is made whether to close the auction or to reduce a unit price to present the units again at an auction (Step S46). When the auction is not closed as a result of this determination, the unit price is changed in the same manner as in the above example and the next one session of the auction is repeated. On the other hand, when the divided successful bid processing means 40 determines to close the auction, a successful bid is made on the final number of units and the seller takes back the rest of the units (Step S47). For example, when the auction is closed as a result of the determination in Step S46, the bidder 2(x) makes a successful bid on 900 units and the seller 1(x) of the commodity takes back the remaining 100 units. Finally, the auction is closed in Step S48.

In addition, when the number of units desired to be purchased by all bidders is less than the number of units on sale when one session of the auction is ended due to a timeout, determination of whether to close the auction or to reduce a unit price is enabled by the seller 1(x) determining the minimum number of units to be successfully bid in advance and sending the same to the bid information receiving means 31. Alternatively, the determination is made by the seller 1(x) when, at the end of each session, the divided successful bid processing means 40 sends a determination request to the seller 1(x) to ask what to do via the communication network 4, then the seller 1(x) sends the result of the determination to the bid information receiving means 31 via the communication network 4.

When the auction procedures shown in FIG. 4 are completed, processing returns to Step S28 shown in FIG. 2, then an auction post-processing means 42 keeps all rights of the successfully bid commodity by proxy in custody. When any bidder is granted a right, the auction post-processing means 42 gives assets corresponding to the right according to the number of successfully bid units to the bidder. When the bidder becomes liable for debts, the auction post-processing means 42 collects assets corresponding to the debts according to the number of successfully bid units by proxy. In addition, when the units are kept in custody by proxy, an ID number (proxy keeper ID) is added to each successfully bid commodity.

The auction post-processing means 42 further transfers a predetermined commission fee or the like from the online accounts 1(x) and 8(x) of the seller 1(x) and the bidder 2(x) to the online account 6 for the manager. On the other hand, when a desire of the seller 1(x) does not agree with that of the bidder 2(x), a successful bid is not made, resulting in an unsuccessful auction. In this case, the auction post-processing means 42 collects only the predetermined commission fee from the online accounts 1(x) and 8(x).

Thus, when the number of units on sale presented when auctioned by the seller does not match the number of units desired to be purchased by all bidders, the dynamic setting function of an auction unit price provided to the auction system 100 makes it possible to present the units again at auction by automatically changing the unit price.

In addition, as has been described, the flowchart in FIG. 4 shows the procedures to make it possible for a divided bid by a plurality of bidders. However, the present invention does not exclude the conventional auction system wherein one bidder exclusively makes a successful bid. The present invention improves the convenience for sellers and the bidders by enabling a divided bid under conventional auction procedures.

In addition, in the flowchart in FIG. 2, the procedures are described in sequential blocks for simplification. However, sequential procedures in some of the blocks are different from those shown in the figure or it is possible that the sequential procedures are carried out simultaneously with those in other blocks. Accordingly, it should be noted that the method of the present invention is not limited by the sequences of the blocks. For example, the transfer confirmation processing of Step S26 may be first carried out, then the troublemaker processing of Step S23 is carried out, followed by the group bid processing of Steps S24 and S25. Thus, there is no problem when these processing items are completed regardless of order, before the start of the auction processing of Step S27.

Further, fewer blocks than all blocks shown in the figure may be necessary to execute the method in the embodiment. Still further, in another method, additional blocks (not shown) may be used. In this case, a rectangular block is a "processing block" which can be executed by, for example, software. Likewise, a diamond-shape block is a "determination block" or a "flow control block" which can be executed by, for example, software. In addition, the processing block and the determination block can be executed with a Digital Signal Processor (DSP), an ASIC, or a similar functionally equivalent circuit.

Further, the flowchart shown in FIG. 2 does not represent a syntax for a specific programming language, method or style (e.g., procedure-oriented or object oriented). On the contrary, the flowchart shows functional information that can be used by those skilled in the art for software programming and circuit design. It should be understood that program elements such as initial values of a loop and a variable, use of a primary variable and a routine loop are not shown in some embodiments, including this embodiment.

According to this embodiment, when the seller 1(x) and the bidder 2(x) participate in auctions via the communication network 4, the terminal device 3 checks if the seller 1(x) and the bidder 2(x) have logged in to the terminal device 3 by using the key information given to the seller 1(x) and the bidder 2(x) in advance. Moreover, this key information is distributed to the seller 1(x) and the bidder 2(x) via a leased line or a VPN line without using a general public communication network such as the internet. Accordingly, there is not much danger of the key information being intercepted by a third person.

Further, according to this embodiment, when a bidder who desires to participate in the auction system 100 is accepted, the auction system 100 checks if a bid price can be withdrawn from the account of the bidder or if the bidder has a troubled history, and accepts the bidder if there is no problem, or refuses the bidder when there is a problem. Troubles such as unpaid fees which have occurred in the conventional auction system can be thus reduced significantly.

Further, according to this embodiment, there is provided an online auction technology enabling a plurality of bidders to purchase a high-price commodity in a cooperative manner and share the proprietary right easily and safely. Such a bid and proprietary right sharing could not be enabled by the conventional auction system.

Second Embodiment

Next is an example of applying the foregoing auction system 100 to a trade of a viatical and life settlement policy. The viatical and life settlement policy is a right to receive insurance money after a patient suffering a fatal disease dies or an elderly person (an insured) has only a few years to live as determined by a doctor. The insured obtains the viatical and life settlement policy, which the surviving family members of the insured should receive in principle, while he/she is alive and sells the same to a third person, then the third person receives the insurance money after the insured dies. In addition, the viatical and life settlement might be abbreviated to "life settlement" and the life settlement has the same meaning as that of the viatical and life settlement unless the words "life settlement" includes a viatical and life settlement as an "optional" life settlement.

As aforementioned, the viatical and life settlement policy is traded between the insured and the third person (hereinafter referred to as "purchaser") via an agency. By the way, when the remaining life span is estimated by a doctor, a predetermined fixed return rate is applied according to the estimated remaining life span. For example, when the estimated remaining life span is 1 year, a return rate of 12% is applied, when 2 years, 28% is applied, when 3 years, 42% is applied, when 4 years, 50% is applied, when 5 years, 60% is applied and so on. Assuming that a person takes out a policy of 100 million yen on his/her life and the remaining life span of the insured is estimated to 3 years, the estimated remaining life span of 3 years is merely a value estimated by the doctor and the insured therefore does not definitely die after three years. Consequently, the insured usually obtains a sum calculated by subtracting the insurance proceeds corresponding to 4.5 years, which is 1.5 times 3 years (assuming that the insurance money per month is 30 thousand yen) and a commission fee for the agency (15%) from 100 million yen represented by the following equation: 100 million yen-30 thousand yen×12 months×4.5 years-15 million yen-office work commission fee=83 million yen by selling the viatical and life settlement policy.

On the other hand, the purchaser deposited (invested) 100 million yen corresponding to the insurance money into a reliable account (a so-called escrow account) and paid monthly insurance premiums. Then, when the insured died, the purchaser received 142 million yen calculated by adding a return (disbursement) of 42% corresponding to the estimated remaining life span of 3 years.

For the purchaser, the viatical and life settlement policy is a target of investment because the actual estimated remaining life span of three years differs from a calculated value. More specifically, according to the foregoing example, when the estimated remaining life span is three years, the return rate of the viatical and life settlement policy is 42% which can be converted into 42%/3=14% in terms of annual interest. When the insured dies after one year, the insurance money to be received after three years is really received after one year. This means that the purchaser can receive a high return of the insurance money converted into 14%×3=42% in terms of annual interest. That is, the purchaser is promised 142 million yen as a return from the life insurance when ever the insured really dies. When the insured dies before the end of the estimated remaining life span, the purchaser receives the money from the life insurance earlier than the scheduled date.

The purchaser can use the collected money from the life insurance to make an investment in another viatical and life settlement policy. Thus, the viatical and life settlement policy always includes a chance of a return so as to be an investment target. On the other hand, when the insured dies after four years, the purchaser has an investment target yielding a low return.

The problem is that the purchaser can only obtain the information about the viatical and life settlement policy via an agency because communication between the insured and the purchaser is anonymous. Accordingly, the agency can deliberately and maliciously manipulate the information so that the correct information is not transferred and the agency can obtain the insurance money through fraud. Thus, an auction system 200 related to the viatical and life settlement policy, which adopts the auction system 100, capable of solving the above problem (hereinafter referred to as "life settlement policy auction system 200") will be described.

Figure 5:
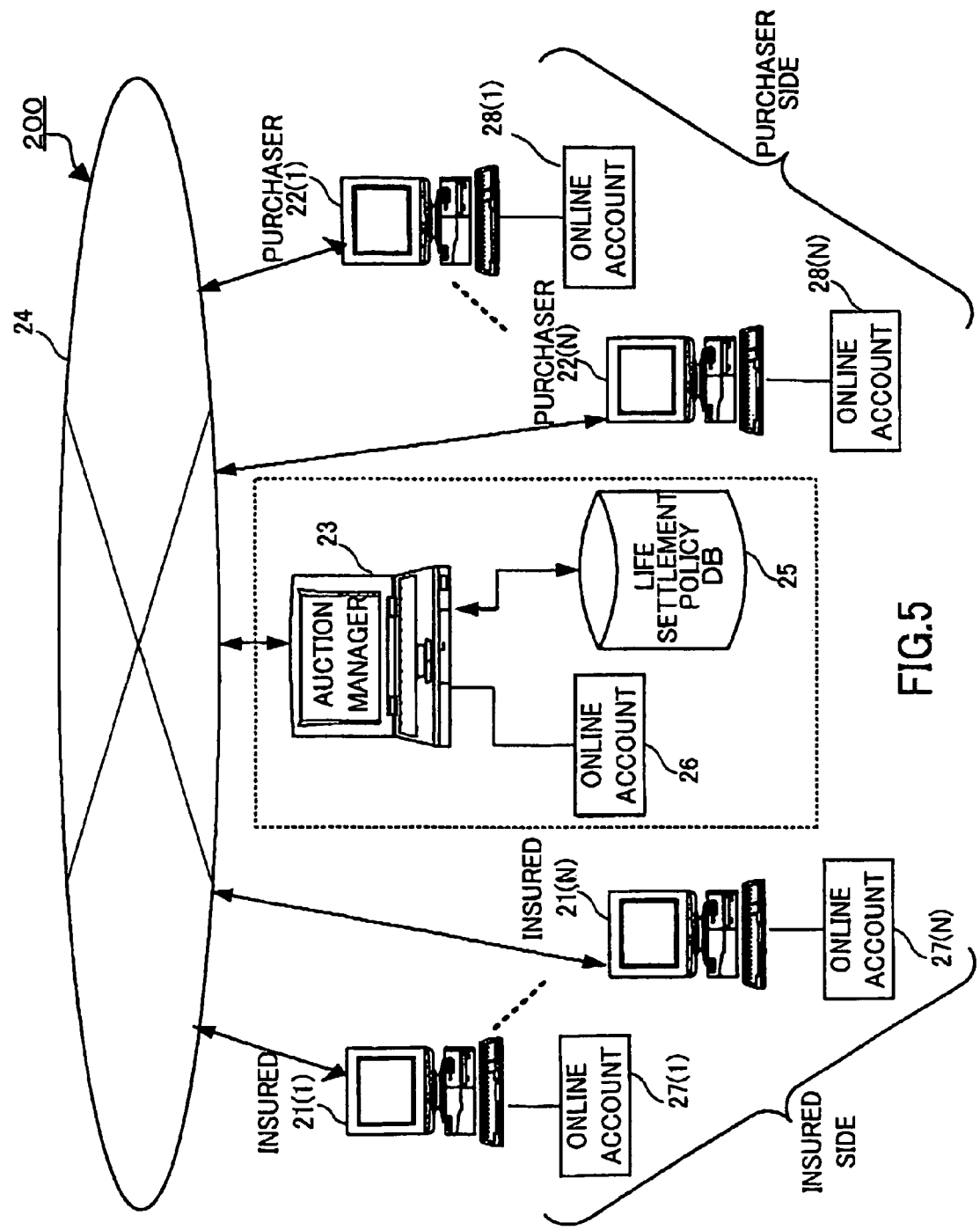
FIG. 5 is a view showing an entire structure of a life settlement policy auction system related to a viatical and life settlement policy of one embodiment according to the present invention.

FIG. 5 shows the entire structure of the life settlement policy auction system 200. The auction system 200 provides a mechanism for carrying out an auction trade of the viatical and life settlement policy via the communication network 4 and adjusting the market price of the life settlement policy.

Figure 7:
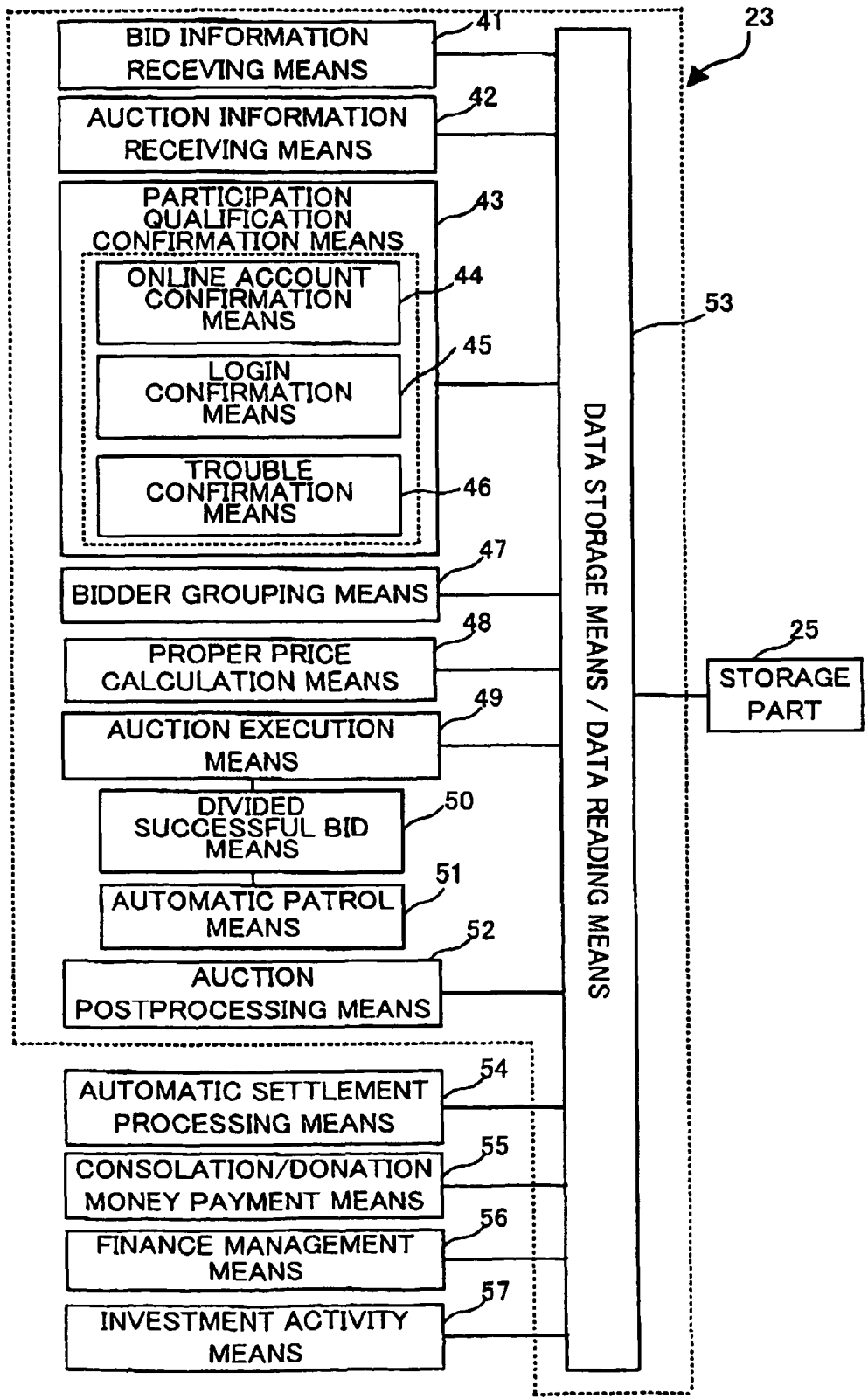
FIG. 7 is a block diagram showing processing means for a manager who operates and manages the life settlement policy auction system of one embodiment according to the present invention.

The life settlement policy auction system 200 comprises a terminal device 23 for an auction manager connected with a life settlement policy database 25, terminal devices 21(1) to 21(*n*) of a plurality of insured people (the insured and the terminal devices thereof are hereinafter assumed to be the same and represented by an insured 21(*x*)), and terminal devices 22(1) to 22(*n*) of a plurality of purchasers (the purchasers and the terminal devices thereof are hereinafter assumed to be the same and represented by a purchaser 22(*x*)) interconnected via a communication network 24 so as to communicate each other. FIG. 7 is a configuration block diagram showing a processing means for the terminal device 23 of the auction manager.

In addition, the functions of the components of the auction system 200 are the same as those of the corresponding auction system 100 in principle. In this second embodiment, a detailed description of the functions of the components which are common to those of the auction system 100 will be omitted, and only functions additionally provided in the auction system 200 will be described. More specifically, an appropriate price calculation means 48 and an automatic patrol means 51 of the terminal device 23 for the auction manager will be described.

An ID number (an auction ID) is added to each viatical and life settlement policy auctioned by the insured 21(*x*). A data storage/reading means 53 of the terminal device 23 stores the ID number correlated with detailed data of each life settlement policy in a life settlement policy database 25, and manages the database 25. The detailed data of the viatical and life settlement is not limited. However, the detailed data specifically includes, for example, information about the sex, age and the DNA of an insured, the name and the condition of the insured, the estimated remaining life span, the name of the doctor in charge of calculating the estimated remaining life span, a calculation standard of the estimated remaining life span, contents of contracted insurance, an insurance policy agreement, the rank of the insurance company and various types of information of the insurance company (e.g., a digitized value of the ability to pay and the legal status of the insurance company).

Further, a participation qualification confirmation means 43 checks if the insured 21(x) and the purchaser 22(x) are qualified to participate in the auction system 200. That is, the participation qualification confirmation means 43 permits only the insured 21(x) and the purchaser 22(x) who have passed a compliance test of the auction system to bid on a commodity.

The auction system 200 is characterized in that the same permits the insured 21(x) and the purchaser 22(x) having participation access to the database 5. When the appropriate price calculation means 48 discloses the detailed data of the viatical and life settlement policy stored in the life settlement policy database 25 to the insured 21(x) and the purchaser 22(x), the insured 21(x) can confirm whether the appropriate price of the viatical and life settlement policy is calculated according to correct information of the insured 21(x), and the purchaser 22(x) can obtain detailed information required to purchase the auctioned viatical and life settlement policy.

In addition, attention should be paid not to disclose information unnecessary for actual purchase of the viatical and life settlement policy of the insured 21(x) to protect the privacy of the seller. This information includes all personal information about the insured obtainable from a medical certificate created by a doctor, the health of the insured, an estimate of the remaining life span, the name of the doctor in charge of calculating the estimated remaining life span, a calculation standard of the estimated remaining life span, contents of contracted insurance, an insurance policy, the rank of the insurance company and other information about the insurance company (e.g., a digital value of the ability to pay by the insurance company, and the legal status of the insurance company).

Further, a participation qualification confirmation means 43 checks if the insured 21(x) and the purchaser 22(x) are qualified to participate in the life settlement policy auction system 200. That is, the participation qualification confirmation means 43 permits only the insured 21(x) and the purchaser 22(x) who has passed a compliance test to bid on a commodity.

The auction system 200 is characterized in that the same permits the insured 21(x) and the purchaser 22(x) qualified to participate to access the database 5 of the auction system 100, which can be accessed only via the terminal device 3. When the appropriate price calculation means 48 discloses the detailed data of the viatical and life settlement policy stored in the life settlement policy database 25 to the insured 21(x) and the purchaser 22(x), the insured 21(x) can confirm whether the appropriate price of the viatical and life settlement policy is calculated according to correct information of the insured 21(x), and the purchaser 22(x) can obtain detailed information required to purchase the auctioned viatical and life settlement policy.

In addition, attention should be paid not to disclose information regarded to be unnecessary for actual purchase of the viatical and life settlement policy of the insured 21(x) to protect the privacy of the seller. This information includes all personal information items to identify, for example, the insured 21(x) (i.e., a seller), such as the name and address of the seller, a name of a family doctor, or a hospital name.

Further, as a data leak prevention means (not shown) of the terminal device 23, the customary security action is taken for security of and prevention of data leaks from the life settlement policy database 25. For example, the data leak prevention means confirms that the insured 21(x) and the purchaser 22(x) are finally permitted to participate in an auction, then grants the right of accessing the life settlement policy database 25 to only the insured 21(x) and the purchaser 22(x).

Further, the appropriate price calculation means 48 treats not only a single viatical and life settlement policy, but also treats a composite commodity formed by integrating a plurality of viatical and life settlement policies (e.g., commodities of various types of unions, investment trust commodities and fraternal commodities) as a commodity, and sets the lowest trade prices of both the single commodity and the composite commodity according to official audits/regulations. Furthermore, in actual auction processing (Step S27 in FIG. 2), the appropriate price calculation means 48 automatically calculates the appropriate market price of the viatical and life settlement policy based on the data and the like stored in the life settlement policy database 25.

The automatic calculation of the appropriate price will be described in detail hereunder.

A single commodity life settlement policy database ("DB") newly treated by the auction system 200 (hereinafter referred to as "single commodity life settlement policy DB"), a single commodity life settlement policy DB already traded (hereinafter referred to as "global life settlement policy DB"), an estimated remaining life span error statistics data DB (hereinafter referred to "estimated remaining life DB") and an item evaluation DB are required for the automatic calculation. A calculation mechanism (e.g., the terminal device 23) for calculating the appropriate price of the viatical and life settlement policy accesses the above DBs to obtain the appropriate price.

The single commodity life settlement policy DB includes at least the following items:

Age, sex and nationality of insured,
Estimated remaining life span (P1)
Type of disease (P2),
Average remaining life span (value obtained from subtracting age of insured from average life span) (P3),
Estimated remaining life span determined from DNA (value obtained from subtracting age of insured from estimated remaining life span determined from DNA) (P4),
Measured immunity value (P5),
Insurance company ranking information/insurance money payment ability (P6),
Life settlement policy evaluation point (Pt)
Life settlement policy evaluation index (Ph), and
Death probabilities in estimated remaining life span data (i.e., probabilities of dying in an estimated remaining life span) for a type of disease, a nationality, an age and a sex, respectively, is stored in the estimated remaining life DB. Point conversion tables and weighting coefficients for search items (P1 to P6) are stored in the item evaluation DB.

An evaluation index is first calculated by quantifying the reliability of the single commodity life settlement policy. For this purpose, an evaluated value of each search item is obtained from the point conversion table by referencing the item evaluation DB, and weighted points of items are summarized and assumed as evaluation points (Pt). Specific examples of calculating Pt are as follows. Pt is a value evaluated on the basis of 100 points, and ri is a weighting coefficient ranging from 1 to 5.

| | |
|---|---|
| Estimated remaining life: 2 years: | P1 = 8, r1 = 3 |
| Name of disease: Lung cancer: | P2 = 5, r2 = 5 |
| Average remaining life span: 10 years: | P3 = 7, r3 = 2 |
| Estimated remaining life judged from DNA: | P4 = 3, r4 = 1 |

| 15 years: | |
|---|---|
| Measured immunity value: 5 (on the basis of 10 points): | P5 = 5, r5 = 1 |
| Insurance company ranking information/ insurance money payment condition: Single A/unconditioned at death: | P6 = 7, r6 = 4 |
| Life settlement policy evaluation point | Pt = P1 × r1 + P2 × r2 + P3 × r3 + P4 × r4 + P5 × r5 + P6 × r6 + = 24 + 25 + 14 + 3 + 5 + 28 = 99 |

In addition, the evaluated values (P1 to P6) and the life settlement policy evaluation points (Pt) may be obtained by accessing the item evaluation DB when the appropriate price of the viatical and life settlement policy is calculated or when the current data at an optional point in time is updated. Needless to say, the item evaluation DB is always updated based on current medical information and the like.

Further, the weighting coefficients (r1 to r6) are preferably set so that degrees of policy risks, are reflected thereto. In the above example, the values of the weighting coefficients (r2 and r6) of the type of disease and the insurance company ranking/insurance money payment condition are larger than other weighting coefficients because, when the disease can be cured by virtue of progress of medical science, or when the purchaser suddenly becomes unable to receive insurance money due to a financial problem of the insurance company, the above events need to be reflected in the life settlement policy evaluation index (Ph).

When the life settlement policy evaluation point (Pt) is determined, the deviation value of the evaluation point of the relevant single commodity life settlement policy is obtained using samples of all evaluation points of the global life settlement policy DB as parameters, and the determined deviation value is assumed to be the evaluation index (Ph) of the single commodity life settlement policy. In addition, the life settlement policy evaluation index (Ph) may be obtained by accessing the global life settlement policy DB when the appropriate price of the viatical and life settlement policy is calculated or based on current data when the data of the global life settlement policy DB is updated. The obtained life settlement policy evaluation index (Ph) may be stored in the single commodity life settlement policy DB.

An example of calculating the life settlement policy evaluation index (Ph) assuming that an average value is 50 and 1 sigma indicating a variation is 10 is as follows:

$$Ph = 50 + 10 \times (Pt - Ptm)/s$$

$$s = \sqrt{v}$$

where, Ptm represents a mean value of evaluation indexes Pt of all life settlement policies which have been bought in the industry, s represents a standard deviation value, and v represents a variation.

For example, when Ptm=89, v=100 and s=10, the life settlement policy evaluation index is Ph=50+10·x·(99−89)/10=60. When the life settlement policy evaluation index (Ph) is close to the mean value of all Ptm values, the life settlement policy evaluation index (Ph) becomes a value close to 50. When the life settlement policy evaluation index (Ph) is in the range from 40 to 60, which is. ±0.1 sigma, it can be known instinctively that the life settlement policy evaluation index is included in orders occupying ⅔ of all Ptm values.

An annual rate R of the life settlement policy can be obtained by correlating the life settlement policy evaluation index (Ph) thus obtainable with a standard life settlement policy interest rate (Rm). In addition, the standard life settlement policy interest rate (Rm) can be obtained by a reverse operation from an established value of an investment activity model and determined by approval of, for example, a board of fair trade run by an official institution. Further, an interest rate may be converted mechanically from the life settlement policy evaluation index (Ph) by using a conversion table prepared in a computer for calculating a fair price (e.g., the terminal device 23 for the auction manager) in advance or by calculation following the definition of a life settlement policy interest rate function (Fr).

An example of the calculation using the life settlement policy interest rate function (Fr) is as follows:

$$R = \text{life settlement policy interest rate function}(Ph, Rm)$$
$$= (50/Ph) \times Rm$$

where, R is Rll when Rll>R, or R=Rul when Rul<R,
Rll: R is a lower limit value and Rul: R is an upper limit value.

Assuming that Ph=60 and Rm=12%, R=(50/60)× 12%=10%, Rll=8% and Rul=116%.

That is, the value of R is lowered when the life settlement policy evaluation index (Ph) is high, and this means that a speculation mechanism starts operating to reduce the return (i.e., the interest rate) because the risk of the life settlement policy maturing is low. On the contrary, when the life settlement policy evaluation index (Ph) is low, the value or R is increased and this means that the interest rate of the life settlement policy is high in return for the high risk. A lower limit of R/an upper limit of R (Rul) is a parameter to specify a lower limit/an upper limit of the interest rate. This parameter is also preferably determined taking into account the real transaction model and approved by the board of fair trade or the like.

An appropriate life settlement policy price (J) can be calculated from insurance money (SY), annual insurance due (hy), an interest rate of a commission fee for an investment trust institution (α) and an annual interest rate of the life settlement policy (R). The α in this embodiment is an amount obtained by multiplying an appropriate price by a specific ratio. In addition, a commission fee to be collected in the actual operation is obtained by, for example, multiplying the total investment amount by a specific ratio. As one preferred embodiment, the foregoing calculation is applied.

$$\text{Assume that investment amount}(I) \text{ is } I = J + SY \times hy \times 1.5 + J \times \alpha.$$

The purchaser requires as the total investment amount a life settlement policy purchase amount (transfer amount) J, the insurance due for an estimated remaining life span (SY) and a commission fee to the investment trust institution. The purchaser however, should obtain the foregoing R value on the premise of paying a larger amount of the insurance due taking into consideration a variation of the estimated remaining life span. For this purpose, the insurance due to be paid is calculated by SY×hy×1.5.

The annual interest rate of the life settlement policy (R) is (H−1/1)/SY. When the investment amount (I) is substituted for this equation to obtain an appropriate purchase amount of a life settlement policy, i.e., an appropriate life settlement policy price (J), is as follows.

$$J = ((H/(R \times SY + 1)) - SY \times hy \times 1.5)/(1 + \alpha) \quad \text{(Formula 1)}$$

For example, assume that H is 100 million yen, R is 10%, SY is 2 years, hy is 1 million yen and α is 5%, then the purchase amount for a life settlement policy (transfer amount) J is about 76.5 million yen. The appropriate price of the viatical and life settlement policy can be thus calculated.

The appropriate price calculation means 48 presents the appropriate price to the insured 21(*x*) and to the purchaser 22(*x*). On a presentation screen, the appropriate price is displayed in a commodity content introduction column, and an evaluation item used to calculate the appropriate price is preferably displayed. In particular, an evaluation index is preferably displayed as an important factor.

In addition, when the foregoing evaluation index is calculated, the basis of such calculation (that is, detailed information of the insurance company such as ranking of the insurance company, legal verification of the agreement of the policy, the payment ability of the insurance company and the legal position of the insurance company; a condition and the name of a disease, the estimated remaining life span and information about a basis of the estimated remaining life span of the insured; a health condition, an age and the like) are preferably disclosed to the insured 21(*x*) and the purchaser 22(*x*).

The terminal device 3 is preferably provided with the automatic patrol means 51 corresponding to a fair trade observation committee related to the viatical and life settlement policy. The automatic patrol is a function for checking a trade history or data of a process of a trade recorded during the trade to see if there is any suspicious or illegal action during the trade. The automatic patrol means 51 then finds an illegal trade together with immediately notifying the system management bureau of the illegal trade and, when the illegal trade meets a specific standard, checks the tendency of the process of the trade to automatically give a warning to the purchaser concerned in the illegal trade.

Procedures and a method of the automatic patrol will now be described.

(1) A database for storing a history and a record of each trade is created. The data stored in the database includes a process and all records of a trade such as how and when prices were named by whom at which life settlement policy trade and the value of a successful bid. Thus, an attitude, a style of investment and an available sum of each purchaser can be known, making it easy to add points to and rank the purchaser.

(2) The creditworthiness of each purchaser can be known from the rank (i.e., a rank indicated by a color) and the number of points of the purchaser. When the purchaser suddenly pays (invests) a much larger amount of money than the largest amount estimated from the creditworthiness, the investment is considered to be abnormal and is then checked and observed. A specific example is that, although a balance in the account of a purchaser has been 20 million yen, the balance suddenly increases to 300 million yen, and the purchaser who usually purchases a commodity of about 2 million yen suddenly starts investing 100 million yen. The investment amount is now compared with the investment history, and when the investment amount apparently increases, a check sheet in which questions of specific items prepared in advance—such as "where do these funds come from?", "to whom do these funds belong?", "are these funds yours?" and "what kind of funds (income) are these?"—are written and automatically mailed from the server (e.g., the terminal device 23) to the purchaser.

(3) The purchaser clicks a corresponding item in the check sheet and answers and then returns the mail to the server. In addition, the purchaser might ignore the check sheet.

(4) When response mail is not returned from the purchaser to the server, the automatic patrol means 51 is programmed to question the result as follows. "The purchaser is not possibly involved in the trade, or even when the purchaser is involved in the trade, since the volume of trade has dramatically increased, where do the funds come from and what kind of funds have been invested?" Consequently, the funds might need to be investigated in relation to money laundering. Accordingly, when the questions contained in the check sheet has been mailed a plurality of times and the response mail is not returned from the purchaser, the patrol automatically notifies the person in charge at the system management bureau of that fact.

(5) Thereafter, a person in charge of compliance makes a telephone call to the purchaser and identifies the purchaser and then asks the questions in the check sheet.

(6) When the check sheet is returned from the purchaser, the patrol means 51 checks items programmed in advance, and when no check mark is entered in any normal response column, contacts the system manager. In this case, the purchaser is asked questions to identify himself/herself directly by a person from the system management bureau, then possibly asked questions about the source and the background of the funds by the same person. When answers given are correct, the compliance check is ended. If not, submission of documents to prove the legality of the funds might be required. ("Submission of documents" means presentation of proof to be checked. For example, when the purchaser answers "the source of the suddenly increased volume of trade is property inherited from my parent," is it assumed that the purchaser has a deed and so the purchaser is asked to submit a copy of the deed. When the purchaser answers "the funds were saved in another account," the purchaser is asked to submit a copy of a corresponding page of the bankbook indicating the process of the trade.).

(7) When the purchaser cannot prove the legality of the funds, the purchaser is warned and handed over with a yellow card. As the case may be, a certification card proving that the purchaser has an account in the auction system 200 and the right to use the system is confiscated and participation in present and future auctions is reconsidered. After the purchaser has been warned several times, the purchaser is registered in a black list and temporarily prohibited from using the auction system 200.

(8) A specific purchaser who repeats a unique scheme in a trade is classified and identified by the compliance based on past examples. When each type of purchaser starts a trade at auction (board of fair trade), the automatic patrol means 51 is programmed to pay attention to the tendency of the purchaser more carefully than to an unlabeled purchaser.

Other patrol procedures of the automatic patrol means 51 will be described.

(i) First, assume that the sum value of successfully bid prices is M1, and the sum value of unsuccessful bid prices is M2. The sum value of unsuccessful bid prices means a value obtained by summing the highest bid prices recorded when successful bids are not made after bids are made or successful bids are canceled after the end of an auction. Next, a bidder with M2/M1 exceeding a specific value is preferably marked and the fact that the bidder will be known to the public in an auction is preferably announced (sent) to prevent an illegal operation.

(ii) For unsuccessful bidders who participate in an auction, the number of times each bidder participates in an auction and the unsuccessful bid price sum M3 are recorded. Here, when the number of times the bidder participates in an auction or the unsuccessful bid price sum M3 exceeds a specific value, the value is marked.

(iii) A database containing commercial trade results and capital relations (affiliated company, etc.) between auction participants is installed to record annual commercial trade sums. In addition, the installation of the database is preferably announced (sent) to prevent an illegal operation.

(iv) When the value is marked as described in the above procedure (ii), the database described in the above procedure (iii) is checked. When the database contains the result of a commercial trade, the bidder is marked and temporarily prohibited from participating in an auction. Further, the bidder is deprived of the right to participate in an auction depending on the results of a manual investigation.

The automatic patrol means 51 thus periodically accesses the insured 21($x$) and the purchaser 22($x$) via the communication network 24 to automatically extract a bidder who has illegally raised a bid price in an auction deal.

Thereafter, the automatic patrol means 51 stores the bidder 2($x$) other than a final successful bidder in the life settlement policy database 25 via the auction execution control means 49 or directly each time the bidder 2($x$) raises a bid price. When the number of times the bidder 2($x$) is stored in the database 25 exceeds a specified value (e.g., 3 times), the automatic patrol means 51 registers the bidder 2($x$) as an object of refusal of participation in an auction black list table (not shown). By doing this, it is possible to check the purchaser 22($x$) and the insured 21($x$) participating in an auction and, even during the auction, automatically observe a bidder intending to perform an illegal action and exclude the bidder from the auction.

Like the auction system 100, the auction system 200 is also provided with an auction bid by proxy which integrates bid requests from a plurality of purchasers 22($x$). For a viatical and life settlement policy from the plurality of purchasers 22($x$), a bidder grouping means 47 can automatically extract and group bidders with approximate specifications by the foregoing grouping means and grant the right of making a bid to each group. A decision making right of a proxy auction bidder is determined in a method which has been described in connection with the auction system 100. In addition to this, the decision making right may also be determined according to the highest payable amount of each group member for a policy. In this case, when this group successfully bids on the desired viatical and life settlement policy, a right ownership ratios/insurance due payment duty ratios of the viatical and life settlement policy at the time of making a successful bid are preferably determined according to the highest payable amounts of the members. For example, when one member (Mr./Ms. A) pays 50 million yen to successfully bid on a viatical and life settlement policy of 100 million yen, Mr./Ms. A owns a 50% ownership right and owes a 50% insurance payment. In addition, the insured 21($x$) (i.e., a seller) may present a viatical and life settlement policy for a price including an amount corresponding to the insurance due at auction to prevent a problem if the purchaser 22($x$) does not pay the insurance due after a successful bid. In this case, for example, the price of the viatical and life settlement policy includes an insurance due corresponding to an estimated remaining life span×2 years.

In addition, the desired specification items to be presented to the bidder 2($x$) by the auction system 100 include a commodity classification category, the ID of a commodity (scheduled) to be auctioned, a seller ID, and the highest price of a successful bid made by a group. On the other hand, specification items related to the viatical and life settlement policy to be presented preferably include an estimated remaining life span (e.g., not more than 3 years), a type of a disease (a plurality of types may be presented), and the lower limit of an insured's age.

Like the auction system 100, the auction system 200 is also provided with a function (a divided successful bid processing means 50) for a divided bid of one viatical and life settlement policy by a plurality of purchasers 22($x$). The plurality of purchasers 22($x$) is more than one individual purchaser or more than one proxy auction bidder formed of a plurality of individual purchasers. The divided auction is carried out in the procedures shown in the flowchart of FIG. 4.

In addition, right sharing in Step S28 in FIG. 2 after the end of an auction may be carried out by a proxy commission company other than the terminal device 23 provided with the auction post-processing means 52. Further, the insured 21($x$) concerned in the auction system 200 includes an agency (i.e., a mediator), and the purchaser 22($x$) includes an agency of an investment trust for an organized purchaser, a pension fund, a mutual aid association, a union and a corporation.

According to the auction system 200, the appropriate price calculation means 48 automatically calculates an appropriate market price of the viatical and life settlement policy of the insured 21($x$) based on the fact that the minimum volume of trade of the viatical and life settlement policy auctioned according to official audits/regulations is set. In this way, when the insured 21($x$) sells the viatical and life settlement policy to the purchaser 22($x$), it is possible to prevent the price of the viatical and life settlement policy from being set illegally low by a life settlement policy provider who mediates general services related to purchase and resale, a broker thereof or the like.

Further, it is possible to solve problems related to conventional unclear or illegal disclosure of information about a life settlement policy provider, which often occur in the USA. For the purchaser 22($x$) in particular, information about the viatical and life settlement policy to be purchased is disclosed transparently with the auction system 200 and hence it is possible to carry out a fair trade. Further, the auction system 200 can prevent illegal gain of the life settlement policy provider.

Further, in the conventional auction system, the interest rate of the viatical and life settlement policy is fixed and the expiration date of the life insurance policy is the day when the insured dies and hence the point in time at which the purchaser 22($x$) can receive the insurance money as a dividend is uncertain.

In contrast, the auction system 200 divides the viatical and life settlement policy into a plurality of units, add identifiers (IDs) to the divided units, and manages the units based on the IDs in the online database. The registered units have attribute information necessary for transaction processing, including online settlement derived from the units so that it can be done automatically by the computer. The viatical and life settlement policy can be dealt and the owner registration can be changed freely, and the viatical and life settlement policy can be automatically securitized even after the registration of the units in the database. This means that it is possible to securitize the viatical and life settlement policy as an electronic stock.

Thus, as an existing stock, a net asset value of the viatical and life settlement policy always varies according to various types of detailed data related to the policy. Accordingly, the viatical and life settlement policy can have the same characteristics as those of a stock. This means that the same rules as those required by the Securities Exchange Law are required for the trade of a viatical and life settlement policy. Accordingly, it is easy to prevent an illegal trade violating the Securities Exchange Law in the conventional auction system, such as an action trade wherein the agency gains a large interest rate by the purchase of the viatical and life settlement policy from the insured 21($x$) at an unreasonably low price by setting a price of the life settlement policy in an illegal manner, or a fraudulent business of illegal disclosure of information for selling the viatical and life settlement policy.

Third Embodiment

The third embodiment involves automation of the procedures required of institutions (the insured 21(*x*), the purchaser 22(*x*), the auction manager 23 and the like) related to the auction system in the second embodiment and updating of the life settlement policy database 25 to enable automatic settlement between the related institutions. In order to enable the above processing, the terminal device 23 is further provided with the automatic settlement means 54 in addition to the means shown in FIG. 7. The terminal device 23, a terminal device of a hospital (not shown), and the terminal device of the insurance company (not shown) are interconnected via the communication network 24 so as to communicate with each other.

As aforementioned, the auction system 200 can carry out a divided auction by dividing an auctioned viatical and life settlement policy into units. For example, when hundreds to thousands of unspecified persons make a successful bid on and share a life settlement policy of hundreds of millions of yen, an extremely large number of procedures are required of the auction manager 23, thus unduly complicating a transaction. In order to solve this problem, in the case of the divided auction, the foregoing divided successful bid processing means 50 adds a unit ID to each auctioned unit and stores unit attribute information like the unit ID into the life settlement policy database 25. The unit attribute information preferably includes the number of divided units of the life settlement policy n (i.e., the total number of units), contents of a policy including insurance company information, and the insurance amount, the estimated remaining life span, a bidder ID, a successful bidder ID, and a proxy keeper ID added by the auction post-processing means 52.

In this example, it is assumed that the insured 21(*x*) (i.e., the seller) presents, for example, the viatical and life settlement policy with an insurance amount of 1 billion yen and a monthly premium of 100 thousand yen at a suggested sales price of 100 million yen and the number of divided units n=100 units at auction, and a successful bid is made on the viatical and life settlement policy under the above conditions. When a purchaser A makes a successful bid on 10 units at a price of 1 million yen, the purchaser A is given the right to receive 100 million yen, which is his/her share of 10% (=10 units/100 units), and obligated to pay 10 thousand yen, which is 10% of the share (=100 thousand yen×10%). Accordingly, the divided successful bid processing means 50 can prepare a written contract to report, for example, the formal contents of the bid (the total insurance money, the total insurance due, the share of A, the insurance money received by A, the premium paid by A, the date of the successful bid and the like) to the purchaser A by extracting the attribute information of the units by using the unit IDs as keys from the life settlement policy database 25 and processing the units having the same successful bidder IDs together to prepare the written contract of the units successfully bid by the purchaser A. In addition, it is clear to those skilled in the art that a transaction processing means (not shown) provided to the terminal device or another computer can automatically carry on the sequential processing to prepare the above documents.

Thus, according to this embodiment, various procedures can be made highly efficient. In addition, for an auction other then the divided auction, the processing after a successful bid can be automated by using an insured ID or an auction ID of each auctioned commodity (the viatical and life settlement policy).

The automatic settlement means 54 receives information about the death of the insured (that is, information about when and from what disease the insured died), a health report or a medical fee (medical report) sent from a health manager (e.g., a hospital) periodically (e.g., at every 3 months or every month). The automatic settlement means 54 then searches the information about the estimated remaining life span of the insured already stored in the life settlement policy database 25 and compares this information to the received information to calculate an annual return to the purchaser from the insurance due to be collected from and the insurance money to be paid to the purchaser. The automatic settlement means 54 then issues settlement instructions to send the money to the account 82 of the purchaser every year when the return is annually paid in cash to the purchaser. Thus, a balance is settled (with electronic money) between the online accounts of the purchaser and the insurance company. In addition, when a balance settlement instruction has been issued or a balance has been settled between online accounts of relevant persons, the data storage means 53 stores these facts as current information in the life settlement policy database 25.

Figure 8:
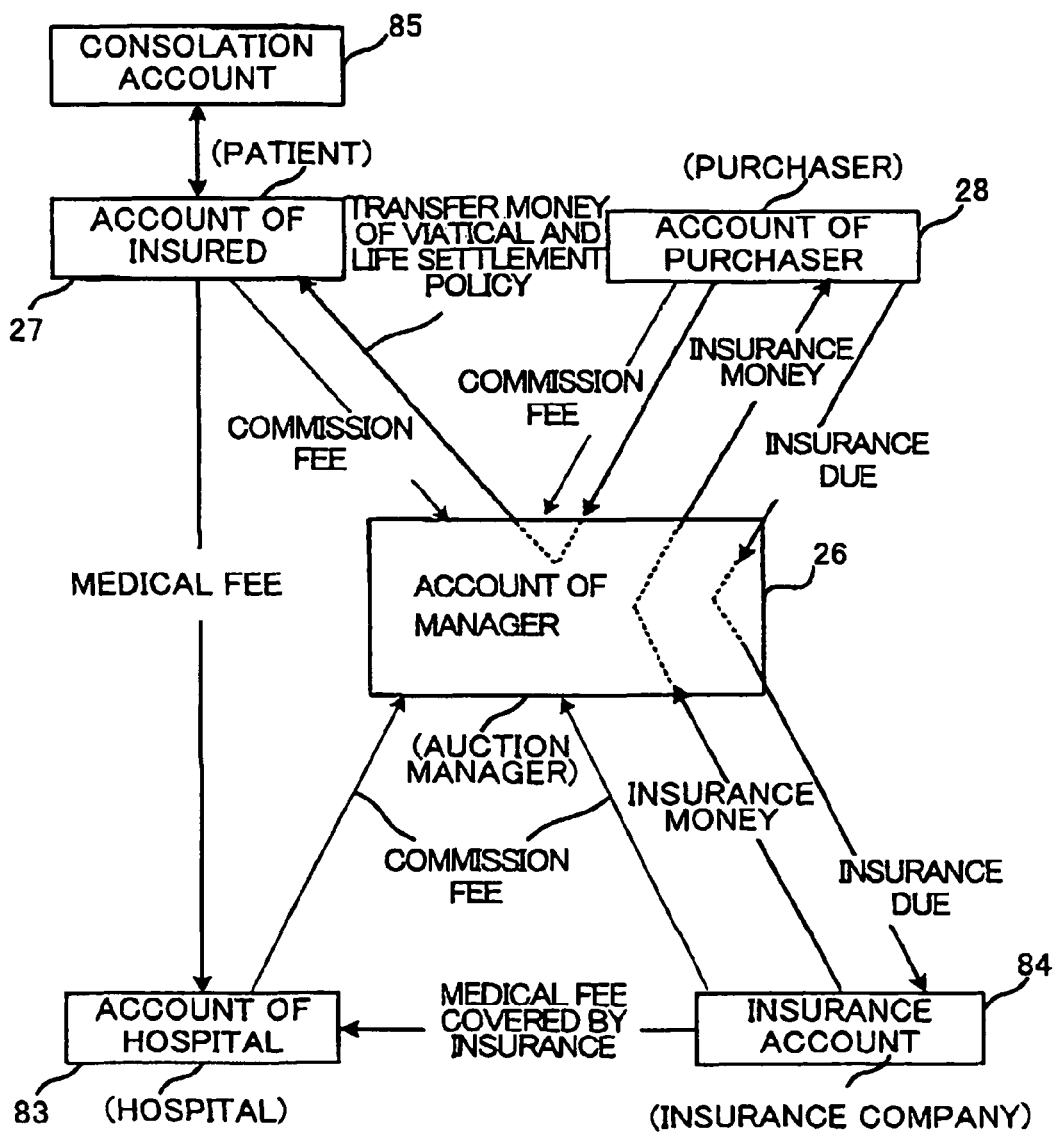
FIG. 8 is a money transaction (money flow) diagram showing a money data flow between online accounts treated by the life settlement policy auction system.

The target of the foregoing balance settlement is not limited to a return, or not carried out only between the online accounts of the purchaser and the insurance company. FIG. 8 is a money transaction (money flow) diagram showing the entire process of exchanging financial data among online accounts of the insured 21(*x*), the purchaser 22(*x*), and the auction manager 23 (the account of insured 81, the account of purchaser 82 and the account the manager 80) indicated in the auction system 200 and, in addition, an account of a hospital 83 of the insured and an insurance account 84 of the insurance company with which the insured has made a contract. Money flows for balance settlements of the online accounts are as follows. Each of these balances is automatically settled between predetermined online accounts based on the information stored in the life settlement policy database 25 in the same manner as the foregoing return.

(i) Flow of payment for viatical and life settlement policy: Account of purchaser→account of manager→account of insured (ii) Flow of monthly insurance due payment: Account of purchaser→account of manager→insurance account (iii) Flow of life insurance payment: Insurance account→account of manager→account of purchaser (iv) Flow of payment of medical fee covered by insurance: Insurance account→account of hospital (v) Flow of payment of medical fee not covered by insurance in (iv): Account of insured→account of hospital (vi) Flow of commission fee payment: Each account→account of manager The automatic settlement means 54 further knows death information of the insured by periodically receiving the information from the terminal device of the hospital and, in addition, confirms that the insured is alive by using an optional sensor for automatically identifying the existence of a person (e.g., a body heat sensor or an infrared ray sensor). The automatic settlement means 54 may further locate the insured by using a position detector (e.g., a GPS) to obtain existence information or the present location of the insured. The health condition (or the existence condition) of the insured may be automatically checked by having the insured always wear accessories such as a bracelet or a necklace or a pacemaker, but the checking method is not limited to this. The data storage means 53 then stores the obtained death information or the health condition of the insured as current information in the life settlement policy database 25.

Thus, according to this embodiment, the balance settlement related to the viatical and life settlement policy can be automated, and hence the hospital can automatically collect a treatment fee or a hospitalization fee without hiring a collection agent or taking legal action, resulting in stable management of the hospital without having bad debts.

Further, since the health condition information of the insured is periodically obtained to update the life settlement policy database 25, an institution (e.g., an investment trust institution, an investment bank, a manager of a specific type of union, a fund operation company or a financial company), which forms a financial commodity based on the viatical and life settlement policy and operates the financial commodity, is able to carry out a transaction by making full use of the life settlement policy database 25 storing the above information. Consequently, convenience the customer purchaser in addition to the investment trust institution can be improved.

In addition, in this embodiment, the collection of the medical fee from the insured by the hospital via the online account is described, and this form can be applied in exactly the same manner to collect a fund from a nursing-care facility such as a home for the aged or an elder care facility. In this case, the "account of hospital" and the "account of insured" shown in FIG. 8 should be replaced with "account of nursing-care facility" and "account of elder," respectively. However, when the amount of an elder's insurance money is less than the total amount spent to take care of the elder (an amount of uncollected obligations), the nursing-care facility absorbs the amount as a loss. Accordingly, the elder must make an agreement to bear an expense above the insurance amount with the nursing-care facility before starting an auction. More preferably, the auction manager 23 should set an appropriate price of the viatical and life settlement policy based on the health of the elder and determine the risk which can/cannot be borne by the nursing-care facility.

Thus, according to this embodiment, an elder who cannot live in a home for the aged or the like due to a shortage of money can live on without being worried about an entrance fee and monthly payments to the home for the aged by selling his/her viatical and life settlement policy at auction. That is, even an elder without any kin or enough money to live on can be taken care of by taking the viatical and life settlement policy in security so as to give comfort to both the elder and the nursing-care facility.

Fourth Embodiment

The fourth embodiment includes the way money flows for balanced settlements in online accounts described in the third embodiment. Additionally, the fourth embodiment adds the way exchanging money data related to a donation (assistance) is handled.

In the same manner as in the third embodiment, the automatic settlement means 54 compares received death information to the calculated remaining life span information stored in the life settlement policy database 25. When a real life is shorter than the estimated remaining life span as a result of the comparison, an assistance/donation money payment means 55 automatically sends an adjustment sum according to the error between the real life and the estimated remaining life span from the account of insured 81 to the account of manager 80. Alternatively, when the real life is longer than the estimated remaining life span, the assistance/donation money payment means 55 automatically sends the adjustment sum from the account of manager 80 to the account of insured 81 in the form of assistance money. In addition, the adjustment sum may be sent to an assistance account 85 opened separately from the account of insured 81.

Further, an appeal for a donation to the insured for an optional life settlement policy other than the viatical and life settlement policy is made by an optional advertisement. When the donation is deposited in the online accounts of the investment trust institution and the financial commodity formation institution (not shown) from the purchaser 22(x) via the account of purchaser 82, and in the online accounts of this investment trust institution and the financial commodity formation institution directly from a third person other than the purchaser 22(x) as a result of the above advertisement, the assistance/donation money payment means 55 classifies the donated money as assistance money according to an error between the real life of the insured and the estimated remaining life span and automatically sends the money to the account of insured 81.

In addition, in the first step of selling the viatical and life settlement policy by the insured, the insured may join a society for mutual aid of insured persons called, for example, a "mutual aid society for insured persons" (hereinafter abbreviated as "mutual aid society"). Whether to join such a society is determined optionally by the insured. When the insured joins the society, the insured pays a predetermined member fee into the mutual aid society's online account (not shown) when the insured sells the viatical and life settlement policy. The member fees collected in the online account of mutual aid society are managed and used only as assistance money as aforementioned and sent to the account of insured 81.

Further, in order to make it possible to send funds to the insured even when the mutual aid society's online account is out of money, a dedicated donation account to receive donations from an unspecified number of persons all over the world may be opened to manage and use the funds as the member fees in the mutual aid society's online account.

Fifth Embodiment

The fifth embodiment relates to the mechanism for making it possible to finance required monthly expenses for the insured to pay an insurance premium and a medical fee by taking the viatical and life settlement policy of the insured in security.

Figure 9:
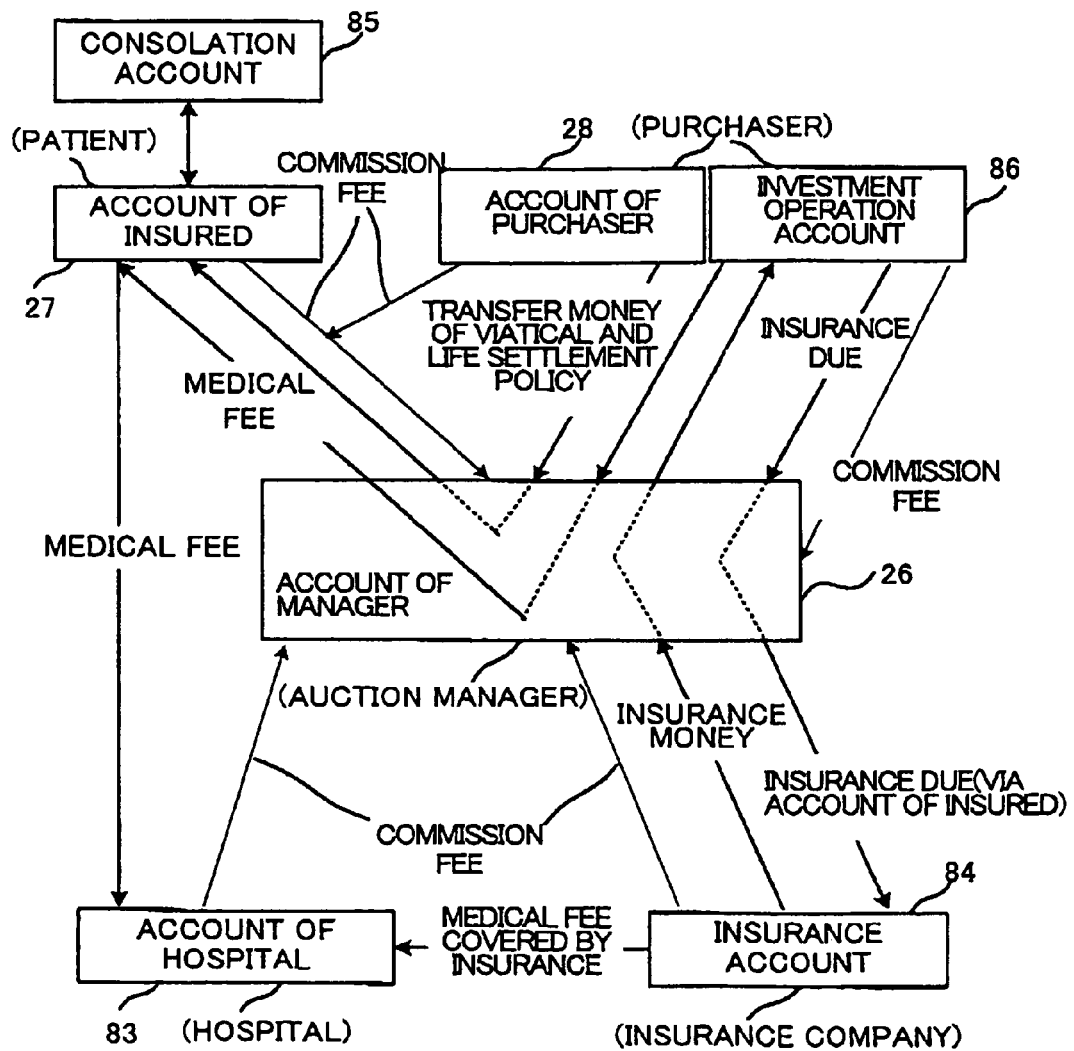
FIG. 9 is a money transaction (money flow) diagram related to an investment activity account in the life settlement policy auction system of one embodiment according to the present invention.

As shown in FIG. 9, a finance management means 56 (see FIG. 7) of the auction manager 23 automatically pays insurance money from the investment activity account 86 to the insurance account 84 via the account of insured 81 and a medical fee from the investment activity account 86 to the account of hospital 83 via the account of insured 81 at predetermined due dates.

Here, the financing institution is a generic name for the auction manager 23 and banks, and companies, institutions and financing service providing parties established for the purpose of financing the insured.

The financing institution finances the insured on the security of the viatical and life settlement policy of the insured. When the insured is successfully cured, the insured can return the financed money with interest. Further, terms of a contract may include a term for returning the viatical and life settlement policy of the insured taken by the financing institution in security when the insured liquidates the financed money with interest within a predetermined period. Simply stated, this mechanism is the same as the logic of a pawnshop as follows. The insured pledges the life settlement policy as security at the pawnshop (the financing institution) so as to receive a specific amount of a divided finance every month or every six months. Meanwhile, the financing institution keeps the viatical and life settlement policy as collateral. Then the pawnshop (the financing institution) returns the viatical and life settlement policy to the insured when the insured liquidates the financed money and the interest thereof. However, the financing institution preferably calculates the money to be financed after investigating the minimum volume of trade of the viatical and life settlement policy of the insured based on the official institution/laws. According to the financing function of this embodiment, the longer the insured lives, the more the amount of interest received by the financing institution increases. Further, the fund flows and transaction flows in all relevant institutions can be automated as in the third embodiment.

Sixth Embodiment

The sixth embodiment relates to a mechanism for risk hedging an obligation (risk) of the purchaser to pay insurance proceeds when the insured lives longer than the estimated remaining life span.

This embodiment is characterized in that the purchaser and the insured cooperate with each other to finance the insurance money corresponding to a surplus of the life of the insured from a purchaser's benefit instead of a bank. Specific examples of types of insured persons applicable to this embodiment include an elder who has a difficulty in paying a monthly insurance premium. Further, specific examples of types of purchasers applicable to this embodiment include an optional corporation or pension fund body aiming to mainly treat long-term assets such as a pension fund.

Like the divided investment on a financial commodity, in the case of the viatical and life settlement policy, shares of the interest of the invested money are divided according to the estimated remaining life span and the type of disease, and this information is collected every year or by lump-sum payment at the expiration date of the policy.

In this embodiment, an online account (the investment activity account) 86 is opened to manage an investment activity fund. An investment activity means 57 (see FIG. 7) pools money to be invested from the account of purchaser 82 to the investment activity account 86 until the expiration date of a financial commodity (e.g., an investment trust) formed by sharing a plurality of viatical and life settlement policies. Then, in order to pay the insurance premium or the medical fee of the insured, the investment activity means 57 automatically transfers money from the investment activity account 86 to the insurance account 84, transfers the investment amount pooled in the investment activity account 85 to the account of insured 81, and automatically sends money to the account of the hospital 83, or makes an investment in another investment trust commodity based on the pooled investment amount.

Alternatively, at the expiration date, the investment activity means 57 transfers an amount obtained by subtracting the medical fee from the purchase amount of the viatical and life settlement policy from the account of purchaser 86 to the account of insured 81 so that the purchaser can receive the remainder of the pooled money. The money received by the purchaser includes the insurance money. Further, the expiration date is preferably set by multiplying the maximum estimated remaining life span of calculated expected life spans included in the plurality of single viatical and life settlement policies by, for example, 1.5. That is, when a viatical and life settlement policy of the longest term of all the plurality of viatical and life settlement policies is due in 4 years, the term is 4×1.5=6 years. By thus extending the term of the viatical and life settlement policy, the money obtained by selling the life settlement policy can be pooled and managed by the investment trust institution for a long period of time, and the insurance money paid by the purchaser can be covered by the interest of the pooled money. Further, the investment activity means 57 can solve the problem that the purchaser does not desire the insured to live longer than the estimated remaining life span.

In addition, the insurance money received by the insured is preferably adjusted at the expiration date according to a difference between the estimated remaining life span of the insured and the real time of death. When the real life of the insured is shorter than the estimated remaining life span, the insurance money is lowered, and when the real life span is longer than the estimated remaining life span, the insurance money is made higher. Consequently, the insurance money can be adjusted according to the error between the estimated remaining life span and the real life span of the insured so that profits can be fairly shared between the purchaser and the insured.

Seventh Embodiment

The seventh embodiment covers a life settlement policy composition system for automatically putting together a financial commodity (financial products, funds and trusts) by combining a plurality of viatical and life settlement policies with different calculated expected lives (e.g., an investment trust of fixed expiration date type or an optional unit commodity which is hereinafter referred to as a "composite right").

Basic information to set a price of the viatical and life settlement policy is the calculated remaining life span information of an insured. However, once the estimated remaining life span is determined by a doctor, the estimated remaining life span has not been adjusted according to an actual lapse of time. Accordingly, when the insured dies earlier than the estimated remaining life span or life spans longer than the estimated remaining life span, the value of the viatical and life settlement policy greatly varies at the time of determining the estimated remaining life span. Accordingly, some purchasers suffer a loss due to various risks generated during operation of the system, up to the expiration date.

Hence, the life settlement policy composition system of this embodiment extracts the life settlement policy which is likely to cause a risk and replaces the policy by another policy to drastically change the nature of the right so as to hedge the risk of the purchaser.

The life settlement policy composition system comprises a life settlement policy forming device connected to a database and one or more information terminals for updating information in the database interconnected via a communication network so as to communicate with each other. The information terminals include, for example, a device accessed by the doctor who calculates the estimated remaining life span of the insured. The database may be one or a plurality of databases. Further, the same auction system as the auction system 200 described in the second embodiment may also be constructed.

In order to turn the composite right into a commodity, investigations of single viatical and life settlement policies need to be integrated to form the life settlement policy taking into consideration various purposes. Accordingly, the life settlement policy forming device calculates an appropriate market price of a single life settlement policy by analyzing the relativity between price assessment and market factors of the single life settlement policy for dynamic reformation of the composite right. Further, various transactions accompanied with the formation of the composite right can be handled automatically to save time and labor.

Still further, the single life settlement policy can be divided into a plurality of units (creating electronic life settlement stocks) and processed.

First, an example of a method of calculating the appropriate price related to the single viatical and life settlement policy will be described.

For this purpose, an estimated remaining life span error DB, an item evaluation DB, and a DB of a single life settlement policy already purchased or to be purchased by the investment activity institution, and a single life settlement policy that has been traded in the industry (hereinafter abbreviated to "single life settlement policy DB). are required. The life settlement policy forming device accesses these DBs to obtain an appropriate price.

The single receiving DB includes at least the following items:

Age, sex and nationality of insured
Estimated remaining life span (P1)
Type of disease (P2)
Average remaining life span (value obtained from subtracting age of insured from average life span) (P3)
Estimated remaining life span determined from DNA (value obtained from subtracting age of insured from estimated remaining life span determined from DNA) (P4)
Measured immunity value (P5)
Insurance company ranking information/insurance money payment ability (P6)
Life settlement policy purchase amount Life settlement policy price–insurance money–(life settlement policy purchase amount+(estimated remaining life span×annual insurance due×1.5+ life settlement policy purchase amount×commission fee interest rate))=insurance money–investment amount Annual interest=(insurance money–investment amount/investment amount)/estimated remaining life span The following items are calculated from the above items by a formula, which will be given later, and stored in the single life settlement policy DB:
Life settlement policy evaluation point (Pt)
Life settlement policy evaluation index (Ph)

In addition, when the foregoing life settlement policy purchase amount is a life settlement policy, an appropriate price to be used instead of the life settlement policy purchase amount is calculated from the life settlement policy evaluation index.

The estimated remaining life error DB stores an error between an estimated remaining life span calculated by a doctor before an insured dies (final estimated remaining life span) and a real date of death of the insured (estimated remaining life span error). One of the major features of this system is a mechanism for predicting purchase risk by periodically collecting the final estimated remaining life span and changing the composite right to automatically carry out risk hedging. Accordingly, this system collects and manages data of calculated expected lives with emphasis on the final estimated remaining life span. The life settlement policy forming device refers to the estimated remaining life span error or the obtained deviation value of the error to check a variation, a distortion and the like by using a type of disease, an age, a sex, a nationality, an average remaining life span, a estimated remaining life span determined from DNA, a measured immunity value, a medical institution, and a family doctor as search conditions to investigate the correlation between the search conditions and estimated remaining life span errors. The item evaluation DB stores point conversion tables and weighting coefficients of search items (P1 to P6).

The appropriate price of the single viatical and life settlement policy is obtained by a predetermined formula (formula 2) after calculating a life settlement policy evaluation point (Pt) then calculating a life settlement policy evaluation index (Ph) from the life settlement policy evaluation point (Pt).

That is, assuming that H is insurance money, R is annual interest, SY is estimated remaining life span, hy is annual insurance due and $\alpha$ is a trust investment activity institution commission rate, the appropriate price J is obtained as follows:

$$J=((H/(R \times SY+1))-SY \times hy \times 1.5)/(1+\alpha) \quad \text{(Formula 2)}$$

The life settlement policy evaluation point (Pt) and the life settlement policy evaluation index (Ph) are calculated in the same manner as in the second embodiment and the description thereof is therefore omitted here.

In addition, the evaluation values (P1 to P6) and the life settlement policy evaluation points (Pt) may be obtained by accessing the foregoing item evaluation DB at the time of automatic formation of the viatical and life settlement policy or may be obtained based on current data at an optional point in time when the data in each database is updated. When the life settlement policy evaluation point (Pt) is obtained, the deviation value of the evaluation point of the single life settlement policy is obtained by using samples of all evaluation points in the single life settlement policy DB as parameters, and the obtained deviation value is assumed to be the evaluation index (Ph) of the policy. The life settlement policy evaluation index (Ph) may be obtained by accessing the foregoing single life settlement policy DB at the time of automatic formation of the viatical and life settlement policy, or based on current data at an arbitrary point in time when the data in the single life settlement policy DB is updated, then stored in the single life settlement policy DB. When the viatical and life settlement policy is not purchased, the appropriate price of the life settlement policy is calculated by a computer and the calculated price is used to carry out automatic formation and simulation.

Calculation of the appropriate price of the single life settlement policy described above is merely an example and the present invention is not limited to this. It should be noted that the appropriate price of the single life settlement policy can be calculated with an optional algorithm by using the following information:

Changes in health condition of insured
Estimated remaining life span of insured
Medical certification created by family doctor to be the basis of estimated remaining life span of insured
Diagnosis of family doctor entered in clinical chart in a specific time period in the past to be basis of estimated remaining life span of insured
Result of family doctor of insured (past batting average of calculated expected lives)
Past main results and specialized skills of doctors other than family doctor
Ranking of insurance company contracted with insured
Payment ability and economic stability of insurance company
Legal verification of insurance contract of an insurance company (This verification is necessary because insurance money is dependent on a cause or a place of death.)
Legal regulation related to location of main office of insurance company
Nationality of insured
Age of insured
Past clinical history of insured
Current condition of disease of insured Information about medical technology innovations and change related to various types of disease Current condition of each type of disease (cure rate against medical technology)

Annual total trade amounts of viatical and life settlement policies in various countries (That is, the total number of insured persons, the total number of auctions, the total number of purchasers and a total bidding amount. This data in 26 countries including the USA, Japan, China, the UK, Germany, France, India, Swiss and Canada is collected.)

Accumulated data of dates of deaths of insured persons of viatical and life settlement policies and annual mortality data based on probability density function (In addition, data of each estimated remaining life span, each type of disease, each age and each sex in 26 countries including the USA, Japan, Germany, the UK and France is collected.)

Statistical data of each external factor related to date of death of insured of viatical and life settlement policy (i.e., sigma deviation value of mortality based on data of each estimated remaining life span, each type of disease, each age and each sex in 26 countries including the USA, Japan, Germany, the UK and France)

The following databases store the above information. The system of this embodiment comprises a plurality of databases. However, needless to say, one database may store all data. In addition, information required of all transaction flows to institutions related to the viatical and life settlement policy including office procedures, mediations, office work, creation and distribution of financial statements and the like should also be stored in databases of relevant institutions.

(1) Patient Personal Information DB (DB=Database)

The patient personal information DB includes personal information, except for health condition, such as a name, a personal ID, an address, a contact address, an occupation, a family structure, a current economic condition, a motivation for selling the life settlement policy, a dream or a wish which has come true until the date of death, a family hospital and a doctor name. When, for example, when "doctor name" is clicked on a terminal device or the like which can access this database, data of that doctor can be obtained.

(2) Individual Purchaser Personal Information DB

The individual purchaser personal information DB includes a name, an address, a sex, a contact address, an occupation, a work history, an annual income, a work place, an asset condition, a current source of income, a name of a company with, for example, not less than a 25% share of which is owned by this purchaser, a family constitution, a beneficiary, a list of the number of investments made by the purchaser and investment target commodities, the motivation for making an investment in the life settlement policy, a nationality, a target amount of dividend, a fund type, a source of income and a purpose of investment.

(3) Organized Purchaser Corporation Information DB

The organized purchaser corporation information DB includes a corporation name, an address, a contact address, a type of business, an amount of funds, an amount of ordinary revenue, the number of employees, an establishment date, a stock holder constitution, a type of funds, a purpose of investment, a permission or a proxy letter from a representative director (when an approver is a person other than a president, such as an accountant), a target amount of dividend and a copy of a register.

(4) Pension Fund, Foundation and Corporation DB

The pension fund, foundation and corporation DB includes names, financial statements, the number of persons who pay for a reserve fund (for pension), a target operation plan, an amount of a target annual interest, a source of funds, accumulated revenues and expenditures in a past management and the minimum operation number.

(5) Hospital Information DB

The hospital information DB includes a hospital name, an establishment date, the number of employees, a management condition of a hospital and information about an insured to whom the life settlement policy is transferred.

(6) System Manager Information DB

The system manager information DB includes financial statements, disclosure of an annual balance sheet and a statement of accounts, a comment from an auditor, a ranking, an address of a main office, an annual ordinary revenue, results, a corporate doctrine and a report of social contribution.

(7) Current Conditions of Disease Investigation DB

The current conditions of disease investigation DB includes medical treatment innovation progress data and information about a fact of complete cure of disease and the history thereof.

(8) Doctor DB

The doctor DB includes a doctor name, a hospital where the doctor works, a specialty and the result thereof, estimated remaining life span batting average (scoring degree), an expert skill, a career and a specialty study.

(9) Transaction Flow DB

The transaction flow DB includes information about various transactions and the history thereof

(10) Money Flow DB

The money flow DB includes result data of various money flows and data for retaining and managing the accumulated data (that is, detailed transaction information about when, who, where, how much and the like necessarily entered in account details).

(11) Single Viatical and Life Settlement Policy DB

The single viatical and life settlement policy DB is data indicating information about or reliability of the life settlement policy being retained or operated including all data necessary for deciding on an investment.

(12) Financial Commodity of Life Settlement Policy DB

The financial commodity of life settlement policy DB includes data of a financial commodity based on the life settlement policy being retained or operated, including a commodity structure, an amount of target achieved interest, an assumed value of a current net assets amount such as the life settlement policy, various securities and claimable assets composing a financial commodity being operated, calculated and analyzed values of the risk hedging based on the contents of the financial commodity, and strategy proposal data.

(13) Creation of Statement of Account (Operation Report) for Purchaser DB

The creation of statement of account (operation report) for purchaser DB includes an operation report of a financial commodity of a life settlement policy and a document for calculating a formula for an account.

(14) Online Compliance DB

The online compliance DB includes standards and compliance items for the purchaser and the insured.

(15) Black List DB

The black list DB includes career, characteristics, a photograph and a hobby of a person registered or possibly registered in a black list due to a fraudulent business, and a reason and a history of registration in the black list.

(16) Online Protocol DB

The online protocol DB includes data related to a person who carries out a suspicious trade and a history of the information of the person.

(17) Board of Fair Trade DB

The board of fair trade DB includes check data of a transaction flow and the like to trade the life settlement policy at an appropriate price.

(18) Assisted Patient DB

The assisted patient DB includes information about when and how much assistance money is received by whom.

(19) Donation Escrow Account DB

The donation escrow account DB includes record data in respective transactions for who, when and how much related to donation and the history of the information about the transactions.

(20) Home for Aged and Elder Care Facility DB

The home for aged and elder care facility DB is data of various facilities including a name, a location, a condition, an initiation fee, an annual fee, a condition to determine a condition of the life settlement policy on which acceptance of an elder is secured, each condition of an elder to be accepted, personal data of an elder who actually entered a home for the aged on the security of the life settlement policy, and information about a living situation and a health condition of the elder to be reported from a facility and the history of the information.

(21) Accounts Opened in System DB

The accounts opened in system DB includes information of the history of an account. In addition, types of accounts are an account of patient, an account of hospital, an account of ender care facility, an insurance account, an account of manager, an assistance account, a donation account, a life settlement policy mediated transfer account, an account for investment in the life settlement policy, a composite life settlement policy account, a composite life settlement policy operation account, a bidder's (successful bidder's) account and an account of seller.

(22) Insured (Patient) Death Information DB

The insured (patient) death information DB includes data related to disease, a time, a place and a cause of death of the insured and process data of a range of activity and health condition of the insured during three to six months before his/her death.

It should be noted regarding the above databases that the information stored in the databases is managed with electronic IDs, and when new information is generated in the money flows or the transaction flows in the relevant institutions, the new information is added in a predetermined database automatically or manually and the contents of the database are updated. By the update of the information in the database, analysis between the life settlement policy price and the market factor of this embodiment can be carried out more precisely on a practical basis, resulting in improvement of the commodity value of the composite life settlement policy.

Next, a method of automatically forming the single viatical and life settlement policy obtained by the foregoing method will be described. Types and characteristics of financial commodities (composite life settlement policies) formed by the life settlement policy forming device of this embodiment will be described first.

(a) This financial commodity is such that, when the insured dies, a total amount of insurance money received by all organized purchasers such as a financial commodity formation institution, a pension fund, a trust bank, an investment trust and a union fund operation company is calculated and dividends divided according to investment (financing) ratios of the purchasers are cashed and paid to the purchasers in the form of cash-back. The viatical and life settlement policy can have various forms such as cash-back once a year or every six months (twice in every year). A term of the financial commodity is preferably set to a long or an intermediate term, for example, 3 years, 5 years or 7 years according to the purpose of an operation.

(b) This financial commodity is different from the financial commodity described in (a) in that annual insurance money or a part of capital is paid as a dividend to the purchaser until the expiration date. However, the dividend is not paid in cash but used for a cyclic investment (reinvestment) in a financial commodity of a further life settlement policy. The characteristic of this financial commodity is that the dividend can be increased with the lapse of time according to the "rules of right" by continuing the reinvestment of the annual profit corresponding to the cash-back until the expiration date. In addition, all the dividends are paid as a lump-sum payment at the expiration date.

(c) This financial commodity is the same commodity as that described in (b) and the funds are not locked in (cannot be withdrawn) until the expiration date and instead, the funds can be withdrawn and cashed when necessary without canceling the contract even before the expiration date. The upper limit of an amount that can be withdrawn is however, a balance in the account.

(d) This financial commodity is such that an investment trust, a financial commodity, a stock, a security and a securitized REIT (Real-Estate Investment Trust) stock are integrated on the basis of the foregoing financial commodities (a) to (c) to make up one financial commodity. That is, a fund can be divided and invested to form portfolios by freely incorporating an investment fund, a union commodity and various stocks in the economic market (e.g., an Asian market, an American market or a Euro market) into the financial commodity of the viatical and life settlement policy. A desired return aimed for in advance can be thus achieved. Further, the financial commodity composed of the above financial commodities (like the structure of funds of funds), wherein a plurality of single commodities of viatical and life settlement policies with an undefined expiration date and a fixed return are combined, includes financial commodities of a capital-secured type and a capital-guaranteed type.

(e) The capital for the financial commodities in (a) to (d) based on the single viatical and life settlement policy and the viatical and life settlement policy are secured with the interests of conventional national bonds and 0 coupons of a bank. This financial commodity is operated in parts of each investment trust of so-called capital-secured type and a union commodity in which the capital is secured.

(f) This financial commodity is such that a fund is financed for the insured by a bank taking the viatical and life settlement policy in security and the interest of the fund is cyclically invested in financial commodities like those in (a) to (e) to divide and distribute the interest while making a profit. This financial commodity is of a fixed expiration date type, and whether to receive the dividend of the interest by lump-sum payment or annual cash-back can be selected by the purchaser.

(g) This financial commodity is such that a bank or a fund financing institution takes a financial commodity composed of one or more securitized life settlement policies so as to form the financial commodities themselves into "a fixed expiration date type and a secured (guaranteed) capital type" and "a fixed interest type." That is, this financial commodity is the viatical and life settlement policy of "a fixed expiration date, a fixed interest type and a fixed (guaranteed) capital type."

(h) The life settlement policy forming device of this embodiment can expand trading by dividing the same into a plurality of processes because the single viatical and life settlement policy is computerized and securitized. That is, instead of selling one whole car as is, the car is disassembled into parts; then the parts can be automatically priced according to values and degrees of importance thereof and sold. For instance, the life settlement policy divided into 10, 100, or 500 units are appropriately sold in the market by individual and organized purchasers and each of the units can be freely traded as securities. Accordingly, this financial commodity composed of various securities is such a type that the single life settlement policy is divided into a plurality of units and incorporated into respective financial commodities according to a plurality of different purposes, various operation methods and various schemes. Further, this financial commodity includes a financial commodity formed by freely incorporating the life settlement policy into each type of the financial commodity in (a) to (g) and can be transferred, replaced or exchanged by another commodity before the expiration date.

(i) All kinds of financial commodities accompanied with the composition of the financial-commodities in (a) to (h).

Figure 10:
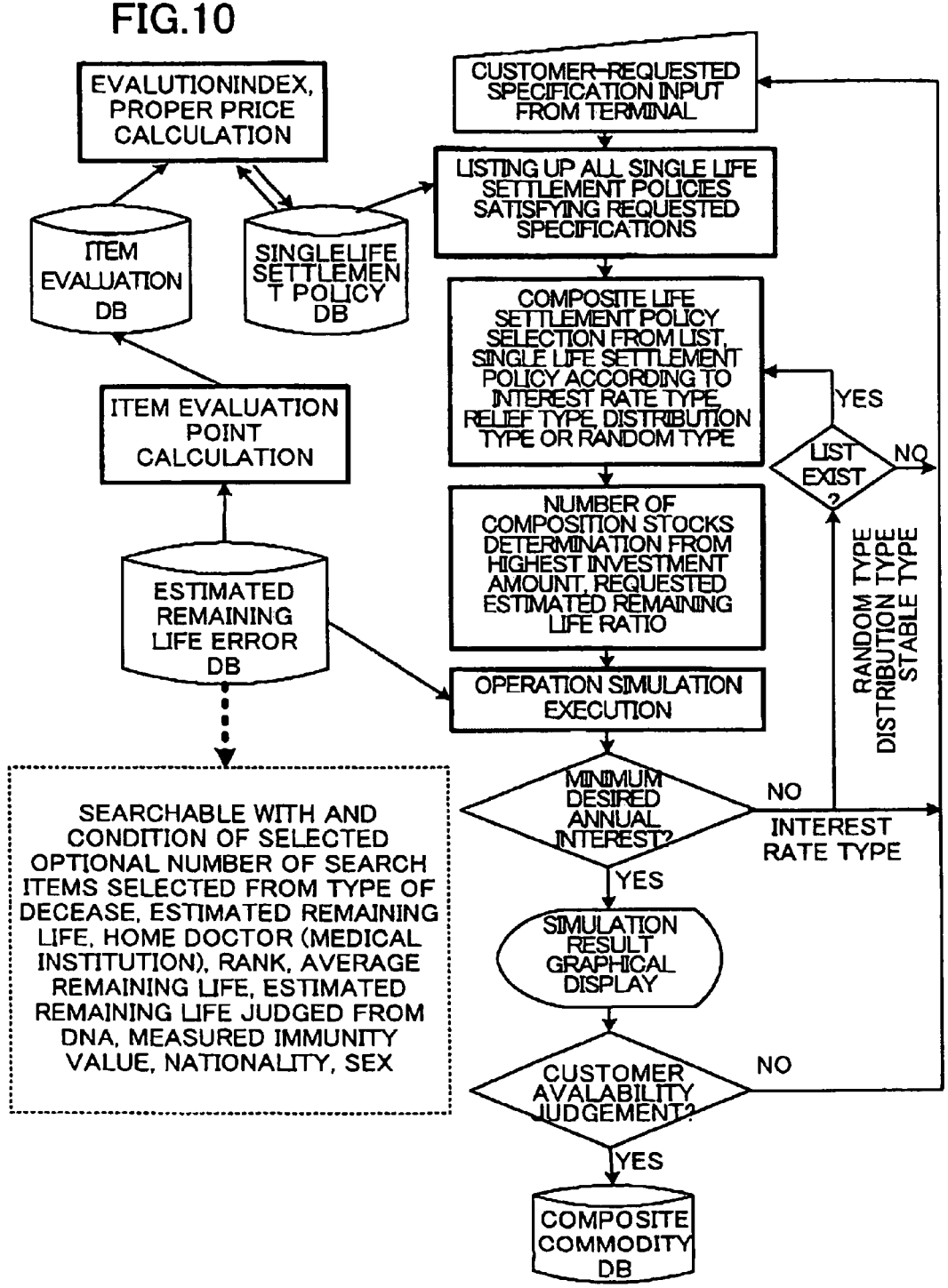
FIG. 10 is a view showing procedures for automatically forming a composite life settlement policy in a life settlement policy formation system of one embodiment according to the present invention.

Next, the procedures of automatic creation of the composite life settlement policy by the life settlement policy forming device will be described. FIG. 10 shows the procedures.

(1) Specifications desired by a customer who wants to purchase the composite life settlement policy are input.

The desired specifications items include the following items:
Operation type (existence of cash-back of annual dividend, etc.)
Highest investment amount
Lowest life settlement policy value (insurance money investment amount)
Lowest annual interest
Expiration date
Type of disease (A plurality of types may be selected.)
Age group
Maximum investment ratio of each estimated remaining life span for total investment amount (values which make the maximum investment ratio not more than 20% for 1-year, not more than 40% for 2-years, not more than 40% for 3-years, not more than 50% for 4-years and not more than 60% for 5-years, when the term to the expiration date is 6 years as shown in an example of the screen display shown in FIG. 11)
Minimum evaluation index of single life settlement policy
Selection of an interest rate type, a relief type (an evaluation index type), a distribution type, or a random type is preferably included.

In addition, FIG. 11 shows an input screen displayed when an annual dividend (return) from a portfolio is cashed in, in the case of a life settlement policy commodity with a fixed return of a fixed purchase amount of the viatical and life settlement policy. It is a matter of course that there is another structure wherein a dividend in a year with no dividend from a portfolio is reinvested in cyclic operation with the life settlement policy until the expiration date. However, the figure shows an example of the screen of a commodity with an annual dividend cashed back.

For example, when a portfolio is formed, an operation style can be selected from an interest rate priority type, a stable type, a distribution type and a random type.

(2) Next, a single life settlement policy satisfying specific conditions among life settlement policies for investment by a trust institution managing the life settlement policy composition system is searched from the single life settlement policy DB by using one or more of the specification conditions as a search key and displayed on the screen if necessary.

(3) Next, n single life settlement policies are selected from those listed in (2) above, for each estimated remaining life span (for the purpose of sharing risk). When the interest rate priority type is selected as a desired specification, life settlement policies are selected in descending order of interest rates R.

When the stable type is selected, life settlement policies are selected in descending order of evaluation indices Ph. When the distribution type is selected, a plurality of life settlement policies with high interest rates R and high interest rates Ph are selected. When the random type is selected, life settlement policies are randomly selected.

(4) Next, the number of stocks of life settlement policies to constitute a financial commodity is determined according to the highest investment amount input as a desired specification and the maximum investment ratio of the estimated remaining life span. At this time, the financial commodity is formed so that money to purchase the stocks of the life settlement policies and the total amount of the appropriate price of a single life settlement policy calculated by the foregoing method are in the range of the maximum investment amount. Further, when a financial commodity with a term of 2 years, for example, is composed of n single life settlement policies, a configuration ratio of life settlement policies may be weighted or equally divided (1/n) according to an adopted style selected from the interest rate type, the relief type, the distribution type and the random type. In this case, a setting function of detailed option specification can be provided on the specification input screen to make it possible for any one of the above operation styles.

Figure 12:
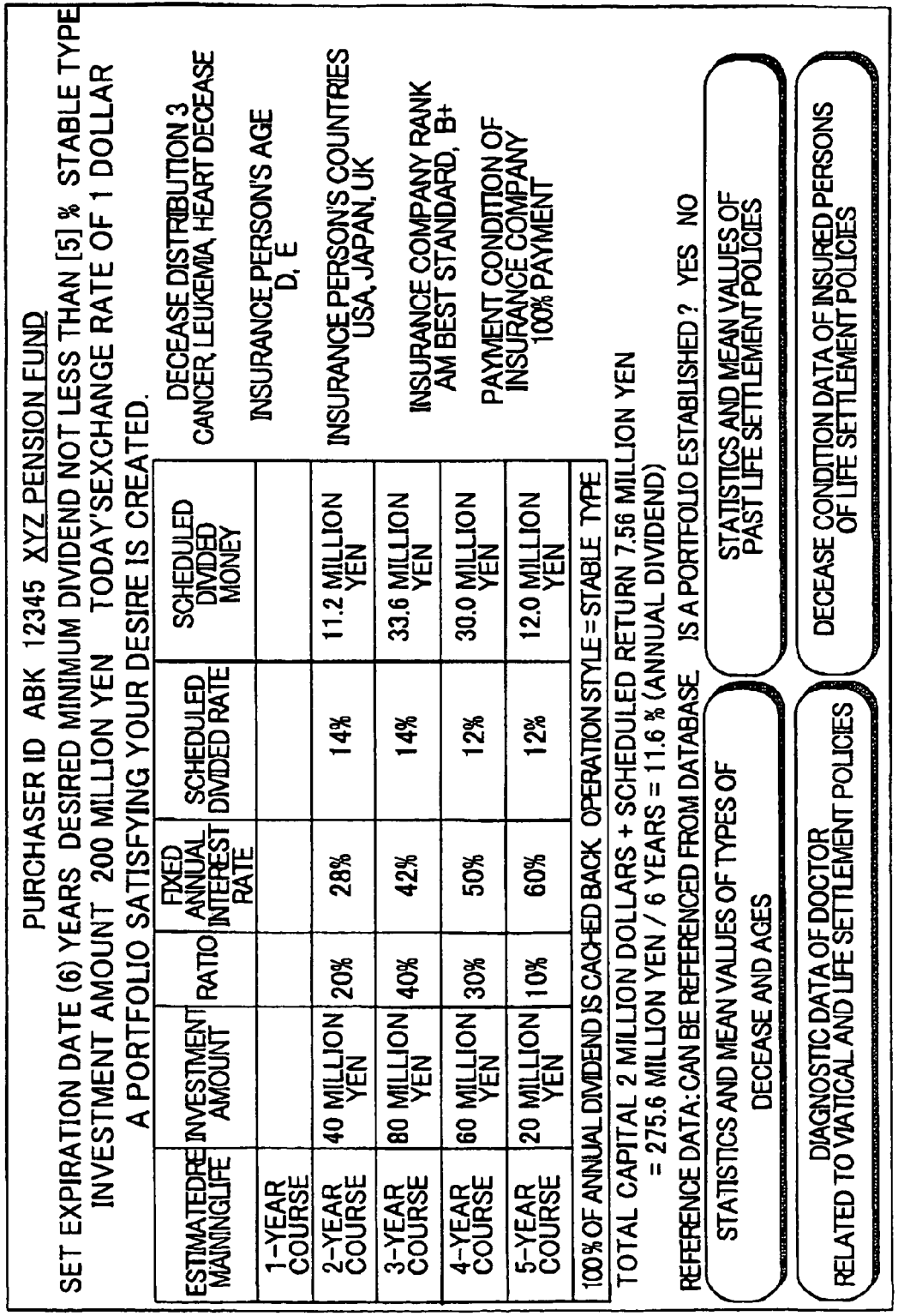
FIG. 12 is a view showing an example of the executed result of an operation simulation.

(5) Next, the operation on the composite life settlement policy is simulated according to the desires of a customer. The operation simulation is to calculate returns received by the customer until the expiration date. The screen shown in FIG. 12 shows an example of execution in cases where a commodity is composed of life settlement policies with fixed returns of which a purchase amount of the viatical and life settlement policy is fixed and an annual dividend (return) from a portfolio is cashed back.

The life settlement policy forming device searches a viatical and life settlement policy corresponding to the category with the contents conditioned on the example of the input screen shown in FIG. 11 then creates and displays a portfolio. Determination of the availability of the composite commodity specification is required of the portfolio. When YES, the formation ends. When NO, another life settlement policy is searched. On this screen, past statistics of key items of analytical data below evaluated value indices of single viatical and life settlement policies (e.g., key items which greatly affect values of single life settlement policies such as past statistics and average death values, various types of disease, home doctors of insured persons, medical specialist doctors, DNA analysis doctors, immunity inspection doctors or nutritionists) and mean value data of the industry can be referenced (by presenting current information from the DB). Further, each data item can be compared to each single life settlement policy to be incorporated into the portfolio of the financial commodity by the purchaser.

As aforementioned, the appropriate price of the single life settlement policy is calculated by updating the estimated remaining life error DB based on current calculated remaining life span information stored in the database. Accordingly, this simulation for the life settlement policy composed of appropriately priced single life settlement policies is carried out based on the current calculated remaining life span information. However, this means that an estimated remaining life span error is indirectly evaluated by evaluating the type of disease. When items of the evaluation index Ph and the interest rate R are referenced and listed in (2), the item evaluation DB is referenced for the purpose of obtaining a point value of a type of disease by calculating the evaluation index Ph. This point value for each type of disease in the item evaluation DB is determined by referencing the estimated remaining life DB. For example, when the insured is suffered from AIDS, an estimated remaining life span error becomes as great as 2 years, resulting in a large deviation; the point value is 3 on the basis of 10 points. When the insured is suffered from stomach cancer, since an estimated remaining life span error is small, the point value is 7.

On the other hand, the estimated remaining life error DB is also accessed and the estimated remaining life span error is used during simulation of an operation. The reason why is because an estimated remaining life span error is an important factor in the operation simulation and the estimated remaining life span error is therefore directly evaluated. Accordingly, it is assumed that estimated remaining life span errors of life settlement policies of the same category as that of the life settlement policy of a simulation target are preferably collected to obtain a mean value added with the estimated remaining life span, to improve accuracy of a predicted timing of death to improve precision of the simulation. Thus, an estimated remaining life span (a date of death of the insured) at the operation simulation is, for example, 3.5 year when an average error is +0.5 year and the estimated remaining life span is 3 years, or 2.3 year when an average error is −0.7 year.

(6) When there are many samples in the single life settlement policy DB at the time of calculating the mean estimated remaining life span error of the life settlement policy of a simulation target, a search condition (a desired specification) at the time of removing the single life settlement policy from the single life settlement policy DB is preferably set in detail to improve the validity of the result of the simulation. For example, a search is executed under AND conditions of a type of disease, the estimated remaining life span, a home doctor (a medical institution) rank, the mean estimated remaining life span, the estimated remaining life span determined from DNA, a measured immunity value, a nationality and the sex, then life settlement policies satisfying the specified conditions are listed above. Alternatively, when the number of samples in the single life settlement policy DB is equal to or less than a predetermined value, the number of search conditions is decreased (e.g., only the type of disease is specified) to increase the number of candidates of life settlement policies to be listed above. In addition, the number of search items may also automatically be determined by feeding back the number of candidates retrieved from the single life settlement policy DB. In addition, other various calculated expected lives can be adjusted by using the estimated remaining life span error statistical data.

(7) Next, check if the result of simulating the operation satisfies the minimum annual interest desired by the customer. The reason for this is that, since calculated dates of death (calculated expected life spans) of insured persons of composite life settlement policies are varied and a mean value of estimated remaining life span errors is summed up at the time of simulating an operation, different from the estimated remaining life span initially assumed by the composite life settlement policy, whether or not the annual interest is satisfied cannot be known until the operation on the estimated remaining life span added with the mean value is simulated. When the interest rate type has been selected at the time of finding out that the minimum annual interest is not satisfied after the execution of the operation simulation, the processing returns, to specification input described in (1), the minimum annual interest is corrected to a lower value, and the operation simulation is re-executed. When the relief type or the distribution type is selected, the processing returns to selection of life settlement policies from the list described in (3), the life settlement policy with the second highest evaluation index Ph next to the highest evaluation index Ph of the previously selected is selected and the operation simulation is re-executed. (Note: To lower the evaluation index Ph means to raise the interest rate R). When the result of repeating this processing is NG, the processing returns to the specification input described in (1) and the minimum annual interest is corrected to a lower value and thereafter the operation simulation is re-executed. Further, when the random type is selected and the minimum annual interest is not satisfied, the processing returns to (3), life settlement policies are randomly selected and the operation simulation is re-executed.

Figure 15:
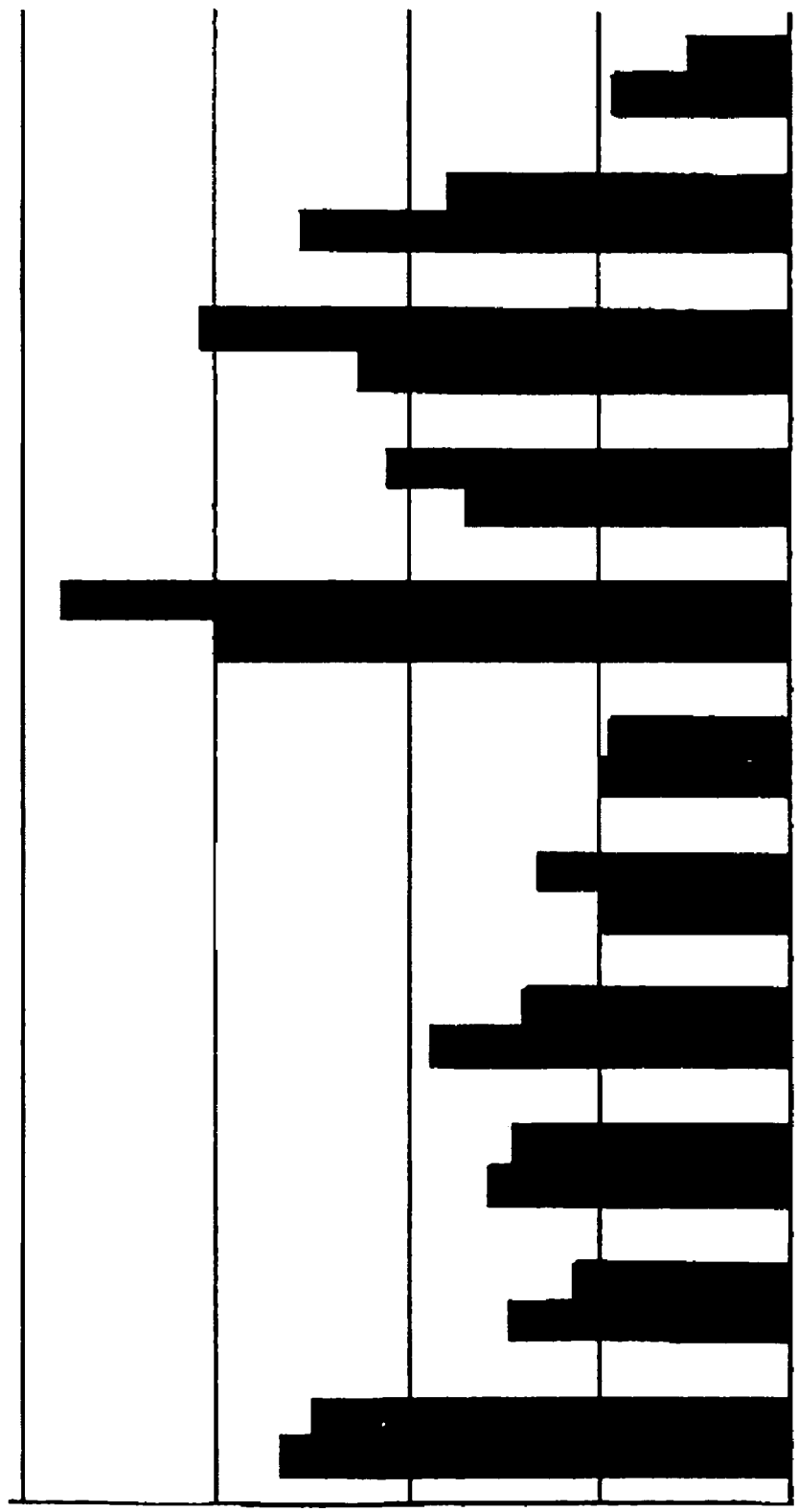
FIG. 15 is a view showing an example of a statistical graph displayed when a specific key item among analytical data key items shown in FIG. 13 is clicked.

FIG. 13 shows an example of a screen whereon data DB of key items of single viatical and life settlement policies are compared to life settlement policies purchased by the purchaser. (For example, since the estimation of the remaining life span is periodically repeated from viewpoints of a home doctor, a medical specialist doctor, a DNA analysis doctor, an immunity inspection doctor and a nutritionist, a change in a substantially correct disease condition of a patient can be caught.) On the portfolio screen shown in FIG. 13, data of key items of analytical data related to single viatical and life settlement policies and evaluated value indices incorporated in the portfolio (e.g., key items which greatly affect values of single life settlement policies such as past statistics and average death values, various types of disease, home doctors of insured persons, medical specialist doctors, DNA analysis doctors, immunity inspection doctors or nutritionists) are compared to past statistics and mean value data of the industry and referenced. FIGS. 14 and 15 show a screen related to past statistics and mean death values of various diseases displayed by clicking a button.

Finally, when the minimum annual interest is satisfied, the contents of a composite life settlement policy at the time are displayed on the screen and the screen enters a wait state until the customer determines whether to approve the contents of the composite life settlement policy. When the customer does not approve the contents, the processing returns to the specification input described in (1) and the processing is repeated or ended when the customer approves the contents.

As is clear from the foregoing example, the life settlement policy is different from a fund composed of other stocks and the like in that the interest rate of the life settlement policy can be clearly calculated.

However, the life settlement policy has a structural problem regarding remaining life span error. Accordingly, it is essential to provide a mechanism to improve the accuracy of the estimated remaining life span error. The life settlement policy forming device of this embodiment has a structure so as to collect current estimated remaining life span error data from a medical institution such as a doctor and store the collected data in a database. Thus, the current and correct error data can be obtained and operation simulation can be executed based on the error data resulting in reduction of customer risk. When the life settlement policy forming device securitizes (forms) the viatical and life settlement policy, it is important to take into consideration risk hedging on various risks (including a risk generated when a disease once assumed to be incurable is cured, and a risk accompanied by the payment of insurance money premiums to a bankrupt party, or acquisition or merger of an insurance company related to the life settlement policy). More specifically, when a specific medicine or a curative means for a cancer is developed, the value of a viatical and life settlement granted to an insured who suffers from the cancer is lowered. Accordingly, risk hedging such as selling a risky life settlement policy and purchasing another life settlement policy, is necessarily carried out.

Further, the life settlement policy formation system is preferably provided with databases for various composite life settlement policies, including single life settlement policies to be components, and items of purchasers who transfer life settlement policies. When insurance money related to a composite life settlement policy is received or an obligation to pay an insurance premium is imposed, a part of the procedures of paying a specific commission fee between relevant persons can be automated by computer processing.

Further, as shown in FIG. 16, the life settlement policy formation system is characterized in that it can divide a single life settlement policy into electronic life settlement policies each of which is made an independent electronic viatical and life settlement policy security (stock), and incorporate the divided security (stock) into financial commodities of various schemes or distribute the divided security (stock) to a plurality of financial commodities so as to be accomplished automatically. That is, it is possible to divide the single life settlement policy into a plurality of units (the "unit" is hereinafter referred to as "electronic life settlement policy") and combine electronic life settlement policies of a plurality of life settlement policies with different estimated remaining life spans to automatically form and operate the financial stock. Since financial commodities can be formed in units of electronic life settlement policies, unlike a combination of single life settlement policies, it is possible to form the financial commodities more flexibly and hence further efficient risk hedging can be expected.

Further, the procedures for forming a commodity composed of stock units is very complicated. In this embodiment however, a life settlement policy ID (a life settlement policy wherefrom a stock is derived), the number of divisions of a life settlement policy (the total number of issued electronic life settlement policies), a composite commodity ID wherein the purchaser is incorporated, a purchaser ID, and an electronic life settlement policy including items of investment ratios for the composite commodity (including the electronic life settlement policy of the purchaser) can be managed as attribute information in a database to support the automation of the procedures resulting in improved transaction efficiency of a trust institution. For example, the insurance money and the insurance premium due of the composite commodity can be determined as ratios of the number of stocks. Further, a mechanism to add the purchaser ID to each electronic life settlement policy and, when insurance money is received or an obligation to pay an insurance premium due is imposed, automatically pay the premium or transfer the money to the purchaser who is an owner of each electronic life settlement policy according to the attribute information of the electronic receiving stock related to the purchaser ID. That is, the settlement related to a composite commodity can be automated like that of the conventional commodity composed of single life settlement policies.

Next, an embodiment of dynamically changing components of a composite life settlement policy according to external conditions will be described.

Specific examples of the external conditions, include a change to the estimated remaining life span (due to a change in the health of a patient or dramatic progress of medical science), insurance company management conditions (including suffering from a sudden disaster, an event such as an error in a stock price due to acquisition or merger of a corporation and the like), change in legal conditions of payment of insurance money by an insurance company at the time of death of a patient (includes not only an agreement but also a change in the law of a country where the main office of the insurance company is located and a change in the law of a country where an insured resides) and the like. The estimated remaining life span of the insured is periodically calculated by a medical institution or the like, the current estimated remaining life span and the ranking information of the insurance company are updated at specific intervals, and the contents of a composite viatical and life settlement policy commodity are dynamically changed according to the contents of a database to automatically carry out risk hedging. The estimated remaining life span has hitherto been determined only once when the insured transfers the viatical and life settlement policy. This conventional system is corrected so that the estimated remaining life span of the insured is periodically (e.g., at every 6 months or every 1 year) recalculated to make it possible to predict a change of the estimated remaining life span in advance so that more accurate and safe risk hedging can be automatically carried out.

Figure 17:
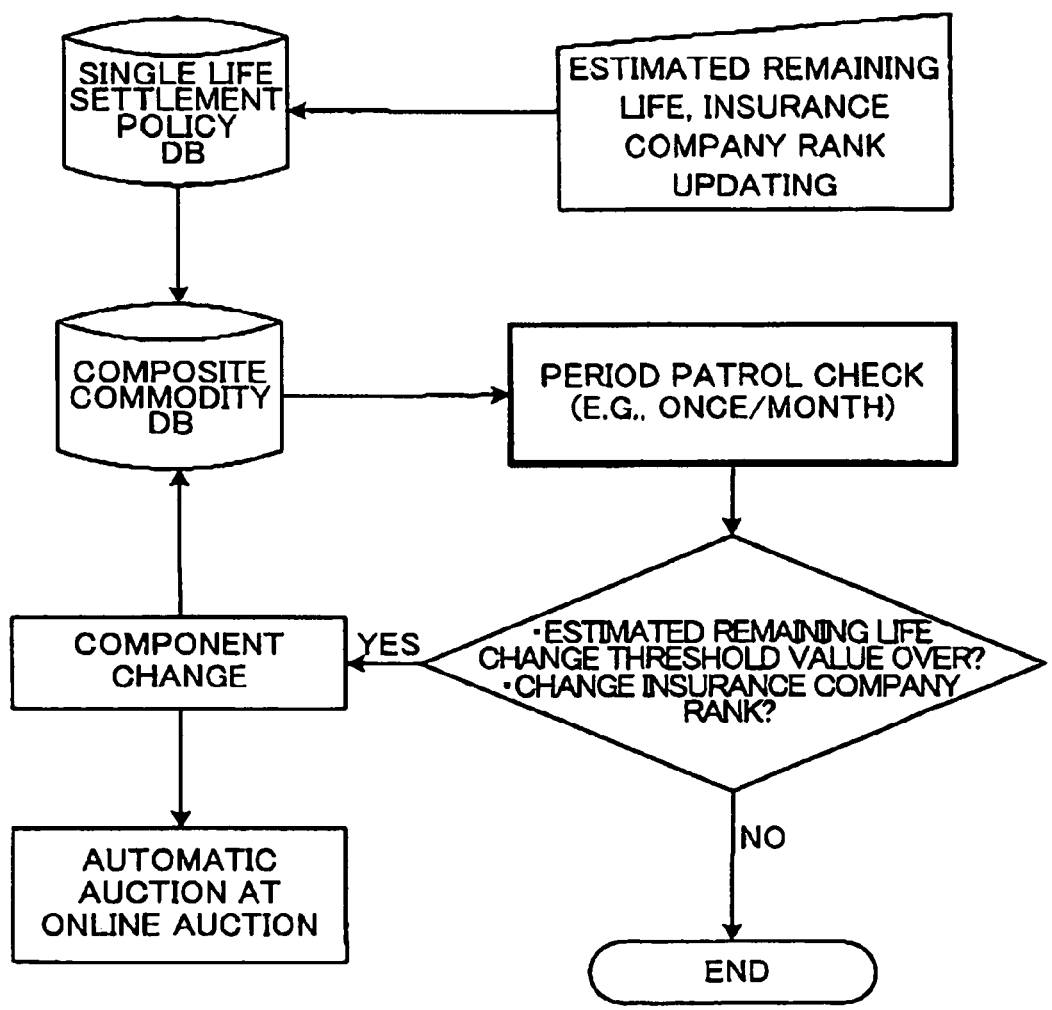
FIG. 17 is a schematic diagram showing procedures to make possible automatic risk hedging of the composite life settlement policy in the life settlement policy formation system.

FIG. 17 is a schematic view showing the above procedures. A function periodically inputs a current evaluation index, an annual interest, and information on the electronic receiving stock related to the purchaser ID. That is, the settlement related to a composite commodity can be automated like that of the conventional composite commodity composed of single life settlement policies.

Next, an embodiment for dynamically changing components of a composite life settlement policy according to external conditions will be described.

Specific examples of the external conditions are the same as those previously described above.

FIG. 17 is a schematic view showing the above procedures. A function for periodically inputting a current evaluation index, an annual interest, an estimated remaining life span, and insurance company ranking information to the life settlement policy formation system is provided. There is provided a function for automatically and dynamically changing the number of electronic life settlement policies when the estimated remaining life span is noticeably changed. For example, assume that an evaluation index or an annual interest is decreased by not less than 20%, an estimated remaining life span of an insured first calculated to be 3 years is extended to a current estimated remaining life span of 6 years as a result of reconsideration and the change in the estimated remaining life span exceeding a threshold value (e.g., 2 years), or the rank of the insurance company is lowered due to a financial problem. When the life settlement policy formation system detects the above event, the life settlement policy formation system dynamically and automatically makes such a change by decreasing composition ratios of relevant electronic life settlement policies so as to prevent risk. In addition, the above predetermined event and the threshold value are determined as rules so as to be referenced by the life settlement policy formation system.

Needless to say, automatic formation processing is re-executed according to the foregoing desire of the customer when the life settlement policy formation system changes the component of the composite life settlement policy. Further, when a change of the estimated remaining life span exceeds the predetermined threshold value, the automatic formation is re-executed to remove the life settlement policy from the composite commodity or the composition ratio of the electronic stock of the life settlement policy is lowered to apply another life settlement policy. Then, the minimum annual interest desired by the customer is satisfied. If satisfied, the operation is continued on the re-created composite commodity as a new composite commodity after announcing the use of the new commodity to the customer. A process of automatically announcing the specifications of the newly created composite commodity to the customer and obtaining approval of the customer may also be incorporated in the system. On the other hand, when the customer is not satisfied with the composite commodity because the interest is not satisfied, another life settlement policy can be applied.

When the financial commodity composed of single life settlement policies is automatically operated, changes of various items are occasionally checked as external conditions and made into a database so as to predict possible future risk by analyzing various factors and information. Then a function for automatically notifying a manager of the life settlement policy formation system, fund managers of various financial commodities, financial commodity forming companies managing the financial commodities, and traders and managers of various union commodities may be provided. Further, a function for automatically calculating an appropriate price of an electronic stock predicted to be highly risky by the life settlement policy formation system by the foregoing method, then automatically presenting the electronic stock at the online auction, may also be provided. In this case, the system can automatically prevent risk.

Figure 18:
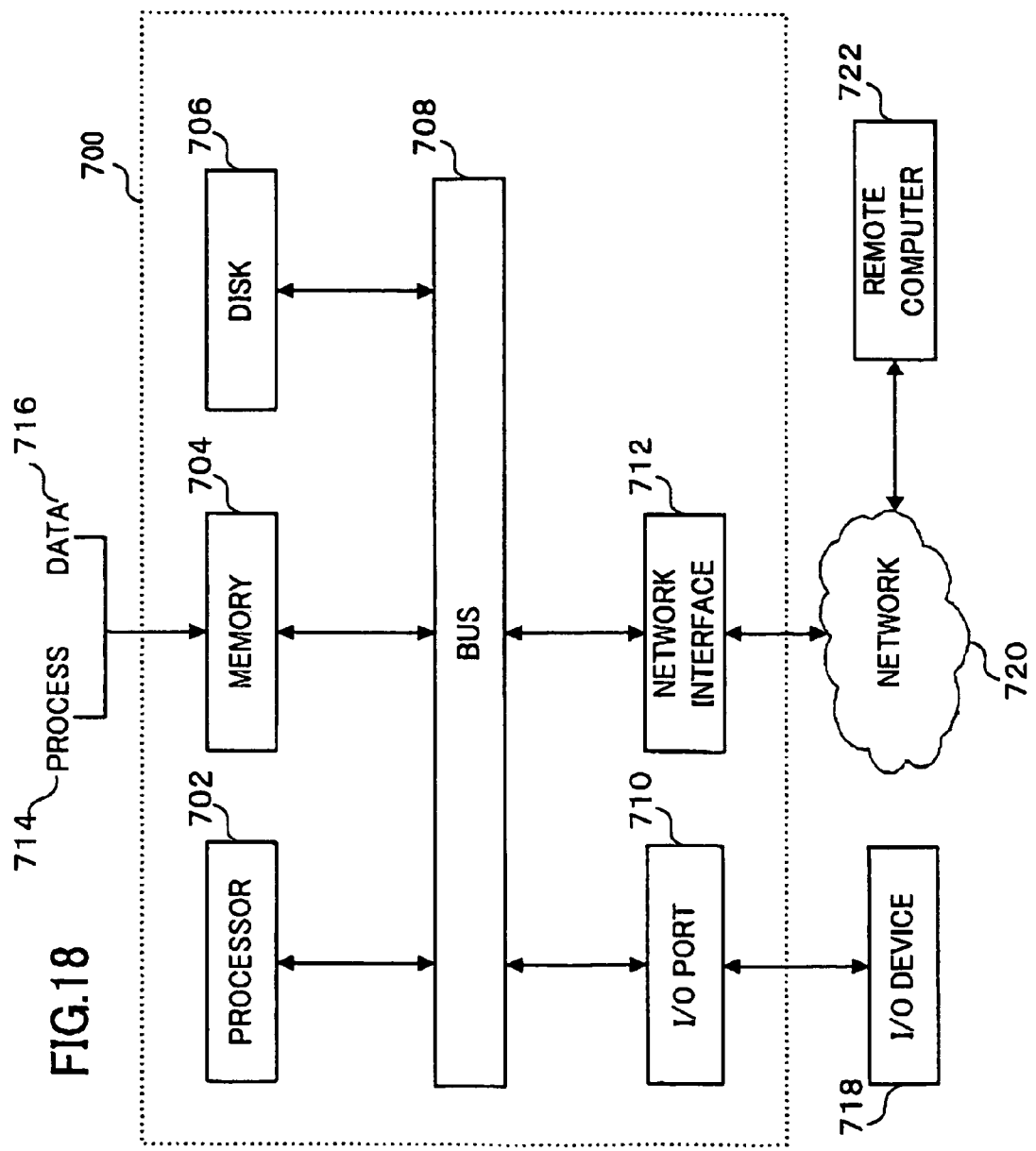
FIG. 18 is a view showing a hardware configuration of a terminal device used in each embodiment according to the present invention.

An example of the foregoing terminal device 3 for the auction manager of Embodiment 1, the terminal device 23 in Embodiment 2, and the hardware configuration of the life settlement policy forming device in Embodiment 7 (hereinafter abbreviated to "arithmetic unit 700") will be described. FIG. 18 shows the configuration of the arithmetic unit 700.

As shown in FIG. 18, the arithmetic unit 700 comprises a processor 702 connected by a bus 708, a memory 704, a disk 706, an I/O port 710 and a network interface 12. The methods executable by a computer described in this specification can be executed on a computer like the computer 700. In addition, it should be understood that a configuration of a computer is not limited to that of the computer 700, but other computers may also be used for the methods described in this specification.

The processor 702 is any type of processor including a dual microprocessor and other multiprocessor architectures. An example of block diagrams showing components provided in the processor 702 are shown in FIGS. 6 and 7. In addition, components which are not directly related to the present invention such as a data output means for the I/O device 718 (a monitor screen) are omitted in FIGS. 6 and 7.

The memory 704 may comprise a volatile memory and/or a nonvolatile memory. Specific examples of the nonvolatile memory include but not limited to a Read Only Memory (ROM), a Programmable Read Only Memory (PROM), an Erasable Programmable Read Only Memory (EPROM), Electrically Erasable Programmable Read Only Memory (EEPROM) and the like. Specific examples of the volatile memory include a Random Access Memory (RAM), a Synchronous RAM (SRAM), a Dynamic RAM (DRAM), a Synchronous DRAM (SDRAM), Double Data Rate SDRAM (DDR SDRAM) and a Direct RAM bus RAM (DRRAM). Specific examples of the disk 706 include but are not limited to devices such as a magnetic disk drive, a floppy (registered trademark) disk drive, a magnetic tape drive, a Zip drive, a flash memory card and/or a memory stick. Specific examples of the disk 706 further includes optical disk drives such as a compact disk ROM (CD-ROM), a CD Recordable drive (CD-R drive), a CD Rewritable drive (CD-RW drive) and/or a Digital Versatile Disk ROM drive (DVD ROM drive). Further, the memory 704 can store, for example, a process 714 and/or data 16.

Specific examples of the data 716 may include a seller 1(x), a bidder 2(x), an insured 21(x), a purchaser 22(x) and data transmitted from an information terminal of the medical institutions in Embodiment 3. The disk 706 and/or the memory 704 can store an operating system for controlling and allocating resources of the computer 700.

The bus 708 can be a any type of bus architecture. The format of the bus 708 can be, but is not limited to, any one of various formats, including a memory bus or a memory controller, a peripheral bus or an external bus, and/or a local bus. The type of the local bus can be, but is not limited to, any one of various types including an industry standard architecture bus (ISA) bus, a micro-channel architecture (MSA) bus, an extended ISA (EISA) bus, a peripheral component interconnect (PCI) bus, a universal serial bus (USB) and a small computer system interface (SCSI).

The computer 700 interacts with an I/O output device 18 via the I/O port 710. Specific examples of the I/O device 718 include, but are not limited to a handle, a keyboard, a microphone, a pointing and selection device, a camera, a video card, a display and the like connected to an insertable device such as a catheter. Specific examples of the I/O port 710 includes but not limited to a serial port, a parallel port and a USB port. The I/O device 18 can be divided into an input device and an output device.

The computer 700 can operate in a network environment and is therefore connected to a network 720 via an interface 712. The computer 700 can be logically connected to a remote computer 722 via a network 720. Accordingly, execution of the methods described in this specification can be shared by two or more communicating and cooperating computers. Local area network technologies to which the network interface 712 can be connected include but are not limited to an optical Fiber Distributed Data Interface (FDDI), a Copper Distributed Data Interface (CDDI), Ethernet/IEEE802.3, Tokenring/IEEE802.5 and the like. Likewise, wide area network technologies to which the network interface 712 can be connected include, but are not limited to, circuit-switched networks such as a point-to-point link, Integrated Services Digital Network (ISDN), a packet switching network and a Digital Subscriber Line (DSL).

As described, the auction system according to the present invention and hardware devices for forming composite life settlement policies are not limited to the configuration shown in FIG. 18. That is, the arithmetic unit 700 may form an arithmetic unit or system wherein a plurality of devices mutually exchange data via the network 720.

One example of this is a system wherein a plurality of hardware devices are interconnected via a communication network (e.g., internet) so as to communicate each other and exchange data therebetween. The present invention can be realized by a server/client system, a grid computer system or the like.

Thus, it can be said that through Embodiments 1 to 7, an unspecified number of persons make bids at a conventional online auction. However, there is a problem in that even a seller or a bidder registered in a black list who has caused trouble due to illegal action in a past auction can make a bid. However, the auction system in this embodiment can exclude in advance a seller or a bidder registered in a black list who has caused trouble due to an illegal action in a past auction.

Further, the auction system can provide a service to share ownership of a successfully bid stock such as a life settlement policy (a viatical and life settlement policy/an obligation to pay insurance money) by purchasing a financial commodity at, for example, hundreds of or tens of million yen by a plurality of bidders instead of an individual.

The auction system further provides a mechanism and a system for determining an appropriate price of trading a stock related to the life settlement policy to solve a problem of purchasing of a commodity from an insured at an unreasonably low price by an agency. Even when the life settlement policy is shared by an unspecified number of persons, a service can be provided by automating the business procedures.

Further, the financial commodity of the life settlement policy can be automatically formed to hold down increased costs caused by complicated back-office transactions with documents such as business procedures and settlement procedures, and reduce expense and management costs required of a financial commodity formation institution, a financial commodity management company, a bank and the like for back-office transactions.

Further, there is provided a technology to compensate/ guarantee a purchase amount of a life settlement policy when an error in the estimated remaining life span of the insured occurs.

Still further, payment of a medical fee including an insurance premium included in a monthly medical fee when the insured is treated can be automated, resulting in remarkable improvement of business efficiencies of relevant institutions.

Furthermore, a mismatch of a purchase price of the life settlement policy can occur due to an estimated remaining life span error resulting in a gap between a required expense related to medical treatment and a price of life settlement policy transfer. Consequently, the relationship between supply and demand is often unbalanced. Or, when a large amount of payment to the insured (the patient) is generated at one time, it is difficult to install an automatic online transfer mechanism and this leads to complicated or insufficient procedures, or loss of a purchaser because the purchaser cannot invest any more money. However, these problems can be solved by providing a financial system technology for receiving insurance money as security.

Still further, there is provided a technology for forming a financial composite commodity of each investment trust or each union based on the life settlement policy composed of electronic life settlement policies, so as to make more flexible risk hedging possible.

What is claimed is:

1. A computer-implemented system for trading a viatical and life settlement insurance policy, comprising:
   (a) means for receiving a selling price of the viatical and life settlement insurance policy, the selling price being provided by a seller of the viatical and life settlement insurance policy;
   (b) means for dividing the viatical and life settlement insurance policy into a plurality of units so that ownership of the viatical and life settlement insurance policy can be shared;
   (c) means for determining a price of one unit based on the number of units;
   (d) means for receiving a purchase price of the viatical and life settlement insurance policy, the purchase price being provided by at least one potential purchaser of the viatical and life settlement insurance policy;
   (e) means for initially determining the number of units bought by the potential purchaser in order to be allocated depending on the purchase price;
   (f) means for comparing the total number of units allocated to the potential purchaser with the total number of units into which the viatical and life settlement insurance policy was divided by the means for dividing;
   (g) means for adjusting the price of one unit based on the comparison carried out by the means for comparing, wherein the means for adjusting the price raises the price of one unit, if the total number of units bought by the potential purchaser exceeds the total number of units into which the viatical and life settlement insurance policy is divided, otherwise the means for adjusting the price reduces the price of one unit, and wherein the means for adjusting the price determines a rate by dividing the total number of units of the viatical and settlement insurance policy by the initially determined number of units bought by the potential purchaser to determine a rate, and multiplying the price of one unit by the rate to determine the adjusted purchase price of one unit; and
   (h) means for redetermining the number of units of proprietary rights of the potential purchaser based on the adjusted purchase price of one unit, wherein the initially determined units for the potential purchaser are reallocated depending on the adjusted purchase price;
   wherein the means for comparing, the means for adjusting the price, and the means for redetermining repeat carrying out their functions for a given amount of time.

2. The system according to claim 1, wherein if the total number of units bought by the potential purchaser is not over the total one of units into which the viatical and life settlement insurance policy is divided by the means for comparing, completion of the trading is decided based on instructions from the purchaser without the means for comparing and the means for adjusting the price carrying out their functions.

3. The system according to claim 1, further comprising:
   means for adding an identifier to each unit of the viatical and life settlement insurance policy;
   means for registering ownership of a units that has been purchased;
   means for attributing to the registered unit information necessary for transaction processing, including online settlement of the unit;
   means for extracting the attributed information of the registered unit using the identifier added to the unit; and
   means for managing the units based on the identifiers.

4. The system according to claim 3, further comprising means for carrying out automated transaction processing using the attributed information.

5. The system according to claim 1, wherein the means for determining the price determines the price based on one of a price set by the seller, the suggested sales price of the viatical and life settlement insurance policy, and a successful bid condition of a similar viatical and life settlement insurance policy in a past auction.

6. The system according to claim 1, further comprising:
   means for modifying a market price for the viatical and life settlement insurance policy at a predetermined interval based on at least one of the estimated remaining life expectancy of an insured person and ranking information of the insurance company, the term and the ranking information being updated at a given interval; and
   means for setting the selling price or the purchase price based on the modified market price.

7. The system according to claim 1, further comprising means for calculating a market price of the viatical and life settlement insurance policy according to the formula $$J=((H/(R \times SY+1))-SY \times hy \times 1.5)/(1+\alpha),$$

where H is the insurance money, SY is the latest estimated life expectancy, hy is the annual insurance premium, alpha is the rate of commission due to trust investment farm, R is the annual interest for the viatical and life settlement insurance policy, and C is a proportionality coefficient.

8. The system according to claim 1, further comprising:
means for calculating a change in the estimated remaining life expectancy of the insured person; and
means for reflecting the change in a market price of the viatical and life settlement insurance policy, if the change exceeds a predetermined range.

9. The system according to claim 1, wherein the viatical and life settlement insurance policy is aimed at least one of elderly people, an insured person's likelihood of dying in the near future, and young and healthy people.

10. The system according to claim 9, wherein a market price of the viatical and life settlement insurance policy for the young and healthy people is calculated based on information including at least one of average expectation of life, immunity, and annual income of the insured person.

* * * * *